US010373227B2

(12) United States Patent
Linden

(10) Patent No.: US 10,373,227 B2
(45) Date of Patent: Aug. 6, 2019

(54) METHOD AND SYSTEM FOR PROVIDING PRODUCT ADVICE RECOMMENDATION

(71) Applicant: Facebook, Inc., Menlo Park, CA (US)

(72) Inventor: Lee Charles Linden, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 14/568,005

(22) Filed: Dec. 11, 2014

(65) Prior Publication Data
US 2016/0171582 A1 Jun. 16, 2016

(51) Int. Cl.
G06Q 30/00 (2012.01)
G06Q 30/06 (2012.01)
G06Q 50/00 (2012.01)

(52) U.S. Cl.
CPC ..... G06Q 30/0625 (2013.01); G06Q 30/0631 (2013.01); G06Q 50/01 (2013.01)

(58) Field of Classification Search
CPC .................................................. G06Q 30/0625
USPC ....................................................... 705/26.62
See application file for complete search history.

(56) References Cited

U.S. PATENT DOCUMENTS

| 7,698,173 | B1 * | 4/2010 | Burge | G06Q 30/02 |
| | | | | 705/26.5 |
| 8,140,402 | B1 * | 3/2012 | Mesaros | G06Q 30/0222 |
| | | | | 705/26.1 |
| 2004/0039989 | A1 * | 2/2004 | Warren | G06F 9/451 |
| | | | | 715/262 |
| 2007/0005437 | A1 * | 1/2007 | Stoppelman | G06F 17/30994 |
| | | | | 705/14.53 |
| 2007/0239552 | A1 * | 10/2007 | Sundaresan | G06Q 10/10 |
| | | | | 705/26.7 |
| 2009/0292814 | A1 * | 11/2009 | Ting | G06F 15/16 |
| | | | | 709/229 |
| 2010/0121866 | A1 * | 5/2010 | Bell | G06F 3/0425 |
| | | | | 707/758 |
| 2010/0198628 | A1 * | 8/2010 | Rayner | G06Q 10/025 |
| | | | | 705/6 |
| 2010/0250336 | A1 * | 9/2010 | Selinger | G06Q 30/02 |
| | | | | 705/26.7 |
| 2011/0320423 | A1 * | 12/2011 | Gemmell | G06F 17/30867 |
| | | | | 707/706 |
| 2012/0278179 | A1 * | 11/2012 | Campbell | G06O 30/0255 |
| | | | | 705/14.69 |
| 2012/0310914 | A1 * | 12/2012 | Khan | G06F 17/30864 |
| | | | | 707/710 |

(Continued)

OTHER PUBLICATIONS

Deriving Ratings Through Social Network Structures (Year: 2006).*
Category-Based Web Personalization System (Year: 2001).*

Primary Examiner — Jeffrey A. Smith
Assistant Examiner — Lalith M Duraisamygurusamy
(74) Attorney, Agent, or Firm — Keller Jolley Preece

(57) ABSTRACT

Embodiments of the present disclosure relate generally to the generation and presentation of product recommendations, ratings and/or reviews to social networking users. More specifically, one or more embodiments of the present disclosure relate to detecting a user's interest in a product or product category and presenting the user with a summary of product information, such as recommendations, ratings and/ or reviews of the product or product category by other users within a social networking system, including by socially connected users.

20 Claims, 12 Drawing Sheets

(56) References Cited

U.S. PATENT DOCUMENTS

| | | | | |
|---|---|---|---|---|
| 2013/0066840 A1* | 3/2013 | Silva | ...................... | G06Q 50/01 707/690 |
| 2013/0073371 A1* | 3/2013 | Bosworth | .............. | G06Q 30/02 705/14.35 |
| 2013/0179265 A1* | 7/2013 | Winslade | ........... | G06Q 30/0261 705/14.58 |
| 2013/0290109 A1* | 10/2013 | Jamal | ..................... | G06Q 50/01 705/14.66 |
| 2013/0311875 A1* | 11/2013 | Pappas | ................ | G06F 17/2247 715/234 |
| 2014/0025692 A1* | 1/2014 | Pappas | .................... | G06F 17/30 707/754 |
| 2014/0082744 A1* | 3/2014 | Behforooz | ............. | G06Q 50/01 726/27 |
| 2014/0089135 A1* | 3/2014 | Linh | .................. | G06Q 30/0601 705/26.7 |
| 2016/0012050 A1* | 1/2016 | Bursey | ................. | H04L 67/306 707/732 |

* cited by examiner

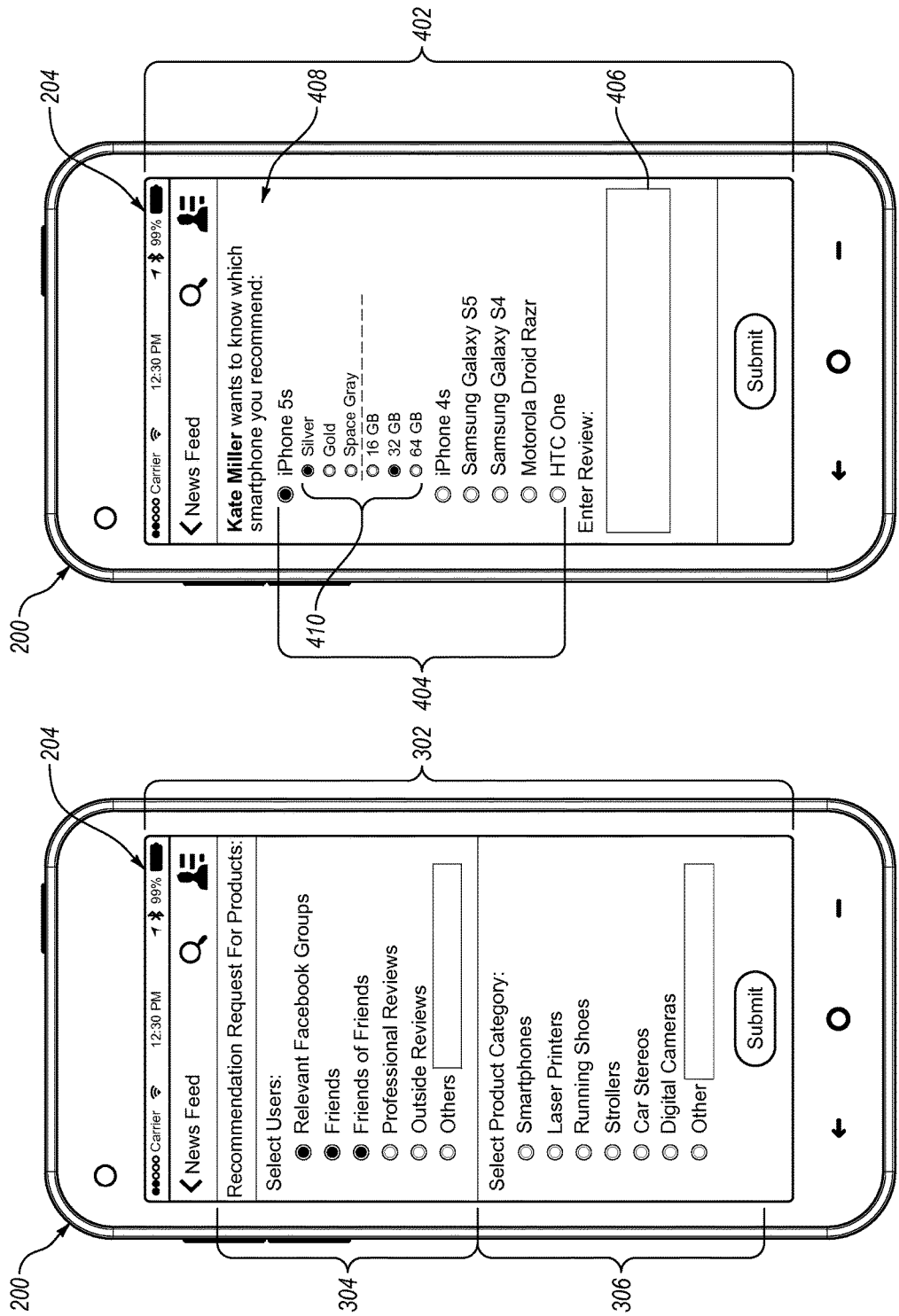

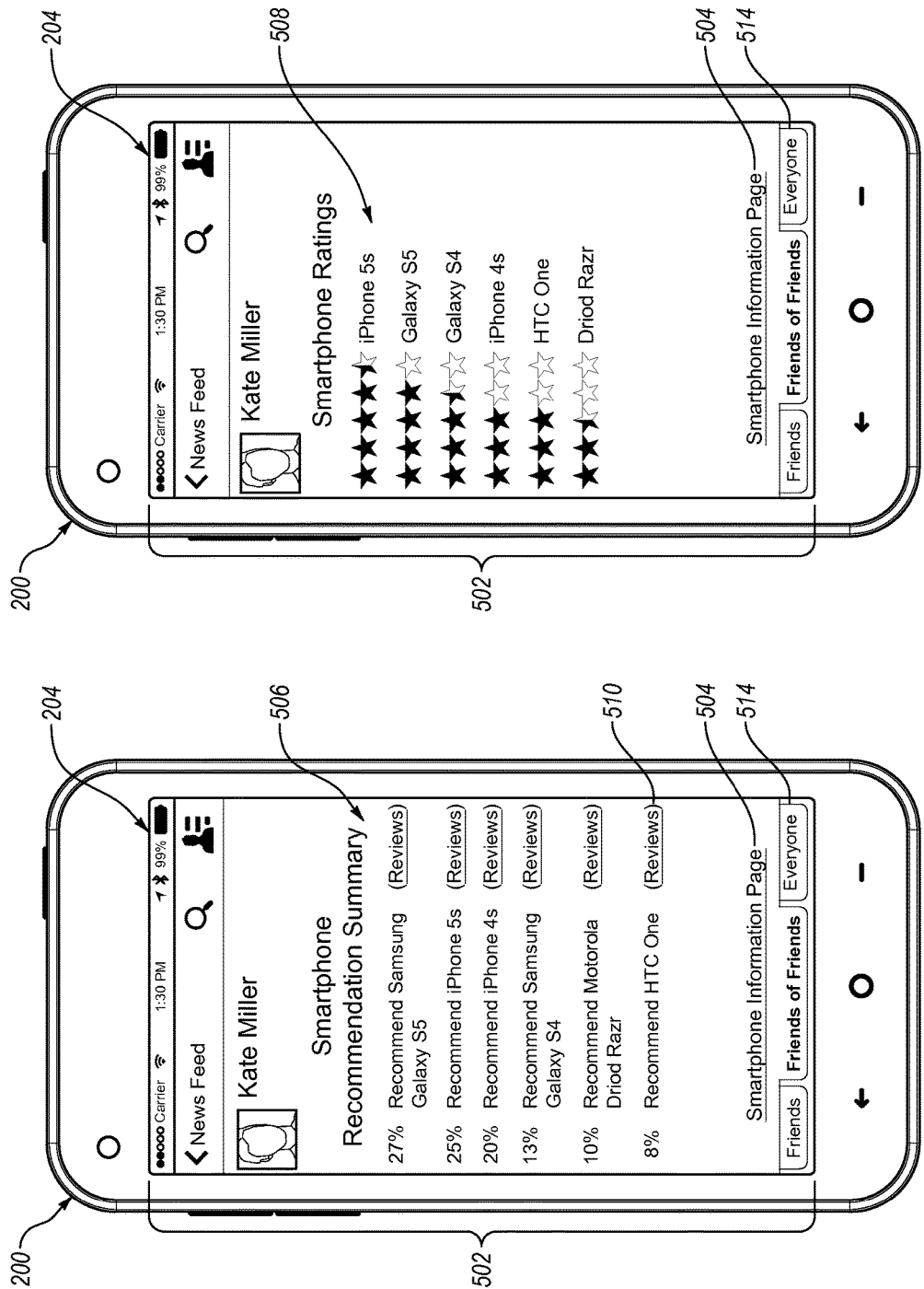

*Fig. 7*

METHOD AND SYSTEM FOR PROVIDING PRODUCT ADVICE RECOMMENDATION

BACKGROUND

1. Technical Field

One or more embodiments of the present disclosure relate generally to methods and systems for obtaining product information. More specifically, one or more disclosed embodiments relate to systems and methods for gathering product information from and presenting product information to users of a social networking system.

2. Background and Relevant Art

People often use the Internet to seek for recommendations or reviews for products (e.g., goods and/or services) before purchasing a particular product. For example, a user may go to a product review website, such as CNET, PC Magazine, or Macworld, or similar websites, to obtain product reviews for one or more products the user is interested in purchasing. However, on such websites, the user often cannot personally verify the expertise or experience of the person(s) providing the reviews/ratings. Furthermore, the user often cannot adjust criteria used to select or filter the reviews/ratings on these websites in a manner that is personalized for the user. In other words, such reviews/ratings are not personalized to the user and do not take into account particular interests of the user.

In addition, when a user is interested in a particular product or a product category, the user must often manually search numerous sources and locations to obtain product information regarding a product. In some cases, a user may ask others for recommendations, such as if a friend would recommend buying a particular product, or which product a friend would recommend the user buy. However, while this information may provide some help to the user, the information is scattered, inconsistent, and difficult to dissect in a meaningful way. Moreover, the user must manually aggregate product recommendations from multiple friends before gaining an overall consensus of whether the user's friends would recommend a product, or which product the user's friends recommend.

Accordingly, these and other disadvantages exist with respect to conventional methods of obtaining product information and recommendations.

SUMMARY

Embodiments of the present disclosure provide benefits and/or solve one or more of the foregoing or other problems in the art with methods and systems for obtaining product information and recommendations. For example, the methods and systems disclosed herein may assist a user of a social networking system to quickly and efficiently obtain product information that is customized based on the needs and interests of the user.

To illustrate, in accordance with the embodiments disclosed herein, a social networking system may detect a user's interest in a product or a product category. Upon detecting the user's interest in a product or product category, the social networking system may prompt the user to create and send a product information request to other users (e.g., co-users) within the social networking system. Alternatively, the user may request to send the product information request independent of any prompting from the social networking system. Further, the social networking system may allow the user to select one or more co-users, to whom the social networking system will send the product information request. In some embodiments, the social networking system may provide the user with recommendations of co-users to select for receiving the product information request. In addition, the social networking system can receive responses to the product information request, aggregate the product information found in the responses, and present a summary of the product information to the user.

In one or more embodiments, upon detecting the user's interest in a product or product category, the social networking system may provide a user with a customized and organized product summary based on the detected product or product category. For example, the social networking system can identify groups of co-users associated with the user. Further, the social networking system can identify, from product activity data of co-users in the identified groups, whether the co-users interacted with the product or product category. The social networking system can generate, in association with each co-user group, a product presentation that summarizes product information customized to the user. For example, the social networking system can provide, to the user, one recommendation for a product based on the opinions and related product activity of one group of co-users, which includes friends of the user, and another recommendation of the product based on the opinions and related product activity of another group of co-users, which includes the user's coworkers.

Additional features and advantages of the embodiments will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These, and other features, will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, and dots) are used herein to illustrate optional features or operations that add additional features to embodiments of the disclosure. Such notation, however, should not be taken to mean that these are the only options or optional operations, and/or that blocks with solid borders are not optional in certain embodiments of the disclosure. Understanding that these drawings depict only typical embodiments of the disclosure and are not therefore considered to be limiting of its scope, the disclosure will be described and explained with additional specificity and detail through the use of the accompanying drawings, in which:

FIG. 3 illustrates an exemplary graphical user interface showing an example process of a user selecting one or more co-users to receive a product information request in accordance with one or more embodiments;

FIG. 4 illustrates an exemplary graphical user interface showing an example of a product information request in accordance with one or more embodiments;

FIGS. 5A-5B illustrate alternative exemplary views of a graphical user interface for providing a summary of product information to a user in accordance with one or more embodiments;

FIG. 7 illustrates a graphical user interface of a social networking application showing a detailed user review summary for a product in accordance with one or more embodiments;

DETAILED DESCRIPTION

Figure 1:
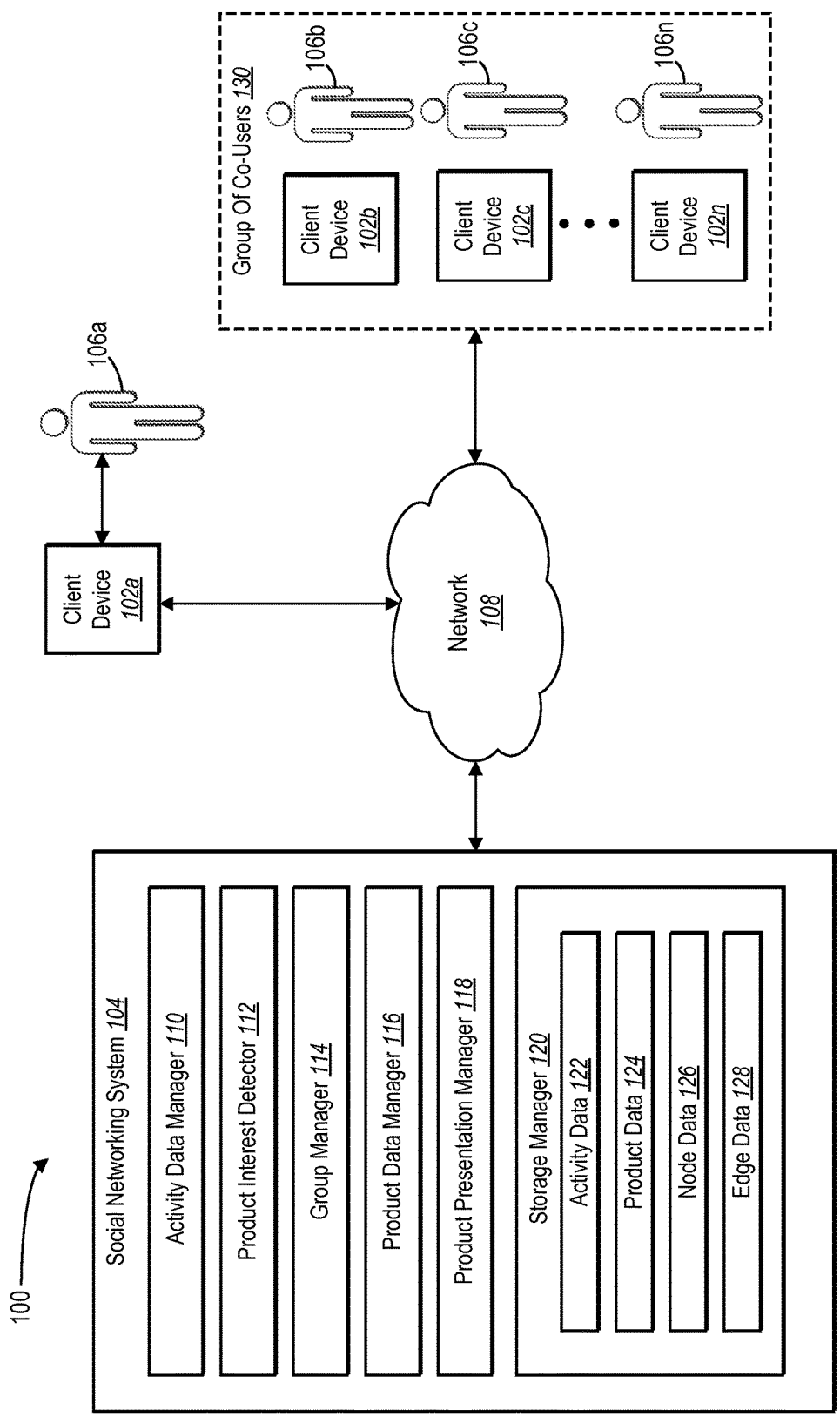
FIG. 1 illustrates a schematic diagram of a system for obtaining and presenting personalized product information in accordance with principles described herein in accordance with one or more embodiments.

The embodiments disclosed herein provide methods and systems for providing users of a social networking system with personalized product information from other users (e.g., co-users in the social networking system). For example, the social networking system can detect a social networking user's interest in a product or product category. The social networking system can then provide, as will be explained in more detail below, a product presentation to the user that includes a summary of product information for the product or product category. The social networking system can further personalize the product presentation for the user by, for example, using product information obtained from co-users of the social networking system that are connected to the user.

According to one or more disclosed embodiments, a user is able to control the parameters the social networking system uses for obtaining product information, which can increase the relevance of the obtained product information for the user. For example, the user may control from whom the social networking system obtains product information, the types of information obtained, the product(s) with which the product information is associated, etc. The social networking system can then aggregate the obtained information and organize it into a presentation that is customized for the user. For example, the social networking system can summarize a subset of the product information and present the product information summary to the user (e.g., within a newsfeed or upon the user accessing a corresponding product page) at a time when the user is likely to be interested in the compiled product information (e.g., when the user visits a page associated with the product), as will be described in more detail below. This presentation of product information allows the user to obtain up-to-date, relevant product information for a product of interest, before deciding whether to purchase the product.

Because the user controls the product information parameters and because the product information is obtained from co-users, with whom the user is familiar (e.g., the user's social networking contacts or "friends"), the obtained information may be more helpful and relevant to the user than commercial reviews or other conventional sources for product information. Furthermore, because the system automates the steps associated with obtaining and customizing the product information, it is much easier for the user to research a product before purchasing.

As described in more detail below, one or more disclosed embodiments may be implemented within or by way of a social networking system. For example, a social networking system can assist a user in creating a product information request and broadcasting the product information request to a group of co-users of the social networking system. The social networking system can compile the responses by the co-users and then present them within a page or graphical user interface associated with the social networking system. For example, the social networking system can present the compiled results within a mobile application associated with the social networking system, within a web interface associated with the social networking system, within the user's profile page on the social networking system, within the user's newsfeed on the social networking system, and/or in some other suitable manner. The user can then utilize the social networking system to share the results of the product information request with co-users of the social networking system (e.g., the user can post the results to the user's profile page). In additional or alternative embodiments, the features disclosed herein may be implemented independent of a social networking system.

In some embodiments, a social networking system can automatically compile and present product information to a user without receiving a corresponding product information request from the user. For example, the social networking system may continuously monitor and maintain product information based on social networking activity of users and then present personalized product information to a user at opportune times. To illustrate, the social networking system may, based on interactions with users of the social networking system, track which products users like, which products users are using, which products users are thinking about buying, what users are saying about products, what products users recommend, and/or any other product information apparent from the activity of the users. The collected product information may be layered onto (e.g., combined with or mapped to) information associated with users themselves (e.g., demographic information, social network connection information, etc.), thereby creating a richer product data set. Thereafter, the social networking system can analyze the product information to identify a subset of the product information that is specific to a particular user (e.g., based on the user's product interests, demographic info, and/or social network connections). For example, the subset of product information may represent product information associated with a group of social networking connections (e.g., "friends," "friends of friends," and/or "followers") and associated with a particular product or product category known to be of interest to the user (e.g., based on the user's own social networking activity). The social networking system can then summarize the subset of product information and present it to the user.

As used herein, the term "product" may refer to any good (tangible or intangible), service, article, or other marketable object or offering. Further, "product" and "products" can refer to a single product or to a grouping of products. The term "product information" may interchangeably refer to any information or data associated with a product or product category. For example, product information may include, but is not limited to, recommendations, ratings, reviews, comments, survey results, statistics, or any other information/data related to a product or product category. The term "product category" may refer to any grouping, type, class, division, subdivision, set, kind, or classification of products.

As used herein, the term "product information request" may refer to a request (whether initiated by a user or automatically initiated by a social networking system) for product information from one or more co-users of a social networking system. For example, a product information request can include a request for co-users to rate a product (e.g., on a scale of 1 to 5, or 1 to 10), a request for co-users to provide a recommendation for a particular product (e.g., to indicate if the user recommends the particular product) or a category of products (e.g., to indicate which product the user recommends for a particular product category), a request for co-users to provide a review of a product (e.g., provide general review information for the product), one or more questions regarding a product or product category (e.g., yes/no questions, multiple choice questions, closed-ended questions, open-ended questions, etc.), and/or any other requests or queries for information regarding a product or group of products.

Example embodiments will now be described in relation to the figures. FIG. 1 illustrates a schematic diagram of an example system 100 for obtaining and providing personalized product information. An overview of the system 100 along with a detailed description of the components and processes of the system 100 will be described in relation to FIG. 1. Thereafter, additional example embodiments will be described in relation to the remaining figures.

As illustrated by FIG. 1, the system 100 may include a client device 102a that communicates with a social networking system 104 over a network 108 (such as the Internet, for example). More specifically, a user 106a using a corresponding client device 102a may communicate with the social networking system 104 over the network 108. In addition, other users 106b-n (e.g., co-users) can also communicate with the social networking system 104 by way of client devices 102b-n.

The co-users 106b-n, along with corresponding client devices 102b-n are collectively referred to herein as a group of co-users 130 (or simply "group 130"). The group 130 can include co-users, to whom the user 106a is connected by way of the social networking system 104. For example, group 130 can include "friends," "friends of friends," family members, co-workers, members of a particular social networking group, or any other group of co-users. Alternatively, the group 130 may include co-users of the social networking system 104 that are not connected to the user 106a, or that are indirectly connected to the user 106a via multiple degrees of separation, as described below. In the broadest sense, the group 130 can include any users of the social networking system 104. In addition, a co-user can belong to multiple co-user groups associated with the user 106a or other users of the social networking system 104.

Each of users 106a-n (collectively "users 106") may be an individual (human user), an entity (e.g., an enterprise, business, or third-party application), or a group (e.g., of individuals or entities) and may post, "like," share, communicate, comment, and otherwise participate within the social networking system 104 by way of the client devices 102.

The client devices 102a-n (collectively "client devices 102") may include any suitable client devices for interacting with the social networking system 104. For example, the client devices 102 may include one or more mobile devices such as mobile telephones, smartphones, PDAs, tablets, and/or laptop computing devices, or one or more non-mobile devices such as desktop computing devices. Additionally, the client devices 102 may include digital cameras, gaming systems, and other devices for capturing and uploading digital content to the social networking system 104.

In some example embodiments, the user 106a may be associated with multiple client devices. For example, the user 106a can interact with the social networking system 104 using a laptop computer, a desktop computer, a tablet, and a smartphone. Alternatively, multiple users may be associated with a single client device. For example, a family of users can use one client device to interact with the social networking system 104.

More specifically, the users 106 may utilize the client devices 102 to interact with the social networking system 104 by way of one or more social networking applications running on and/or accessed by the client devices 102. For example, client devices 102 may run dedicated mobile social networking applications associated with the social networking system 104 and/or utilize one or more browser applications to access social networking content (e.g., webpages) associated with the social networking system 104. In turn, the social networking system 104 may present information and content to the users 106 by way of one or more social networking pages (e.g., web pages or pages/views of a mobile application).

As shown in FIG. 1, the social networking system 104 can include various components for performing the processes and features described herein. For example, in the illustrated embodiment, social networking system 104 includes an activity data manager 110, a product interest detector 112, a group manager 114, a product data manager 116, a product presentation manager 118, and a storage manager 120, in communication with each other using any suitable communication protocols.

Each component of the social networking system 104 may be implemented using one or more computing devices (e.g., server devices) including at least one processor executing instructions that cause the social networking system 104 to perform the processes described herein. The components of the social networking system 104 can be implemented by a single server device or across multiple server devices, as described above. Although a particular number of components are shown in FIG. 1, the social networking system 104 can include more components or can combine the components into fewer components (such as a single component), as may be desirable for a particular implementation.

In one or more embodiments disclosed herein, the social networking system 104 can assist the user 106a in creating and sending product information requests to the group 130, compile responses provided by the group 130, and present a summary of the responses to user 106a. In particular, the activity data manager 110 can track activity data 122. The product interest detector 112 can receive, from a user, a request to send a product information request to co-users in regards to a product or product category. The group manager 114 can assist the user in identifying and selecting one or more groups that will receive a product information request. The product data manager 116 can generate and assist the user in customizing the product information request. The product data manager 116 can also send the product information request to the one or more groups of co-users. The product presentation manager 118 can generate a product presentation based on responses to the product information request, and present a summary of the product information to the user 106a. The storage manager 120 can store, maintain, and retrieve social networking information and data, such as activity data 122, product data 124, node data 126, and edge data 128.

As briefly mentioned above, the activity data manager 110 can track and manage activity data. More specifically, the activity data manager 110 can detect, receive, monitor, and otherwise track activity data for users 106 (e.g., the user 106a and co-users 106b-n) of the social networking system 104.

Activity data can include social networking activity data representative of one or more social networking activities. For example, the social networking activities can include "likes," messages, tags, posts, shares, comments, recommendations, ratings, reviews, communications, invites, connections, views content (e.g., views of profile pages, pictures, communications, etc.), and/or any other activity performed with respect to content or options provided by way of a social networking system, such as the social networking system 104. One or more of the social networking activities may relate, in some way, to a particular product or product category. As non-limiting examples, the user 106a may "like" content (e.g., a picture, a page, or a message) related to a product, tag a product within a post or other communications, share a link (e.g., a URL) for a web page associated with a product, recommend or review a product, and/or rate a product. Accordingly, the activity data manager 110 can detect and store user actions.

The activity data manager 110 may also track activity data representative of one or more activities related to one or more third parties (e.g., third-party retailers). For example, the activity data manager 110 may track—either directly or indirectly—shopping activities of users by way of third-party ecommerce websites or mobile applications. For example, a tracking element may be located on various third-party ecommerce websites and may provide information back to the activity data manager 110 regarding product shopping and/or viewing activities of users. As such, the activity data manager 110 can receive and store activity data that includes what products users are shopping for and have purchased based on their activity outside of the social networking system 104. Additional detail regarding expanded tracking in connection with social networking users is provided in U.S. application Ser. No. 14/460,219, the contents of which are incorporated herein by reference in their entirety.

The activity data manager 110 can track user activity in any suitable manner. In some embodiments, the activity data manager 110 may track activity data by monitoring the users' activity within, access to, and/or use of the social networking system 104. For example, the activity data manager 110 can track use of one or more social networking applications (e.g., one or more web-based or mobile applications running on computing devices associated with the users) associated with the social networking system 104. Additionally or alternatively, the activity data manager 110 can track user activity by receiving activity data from the users' computing devices and/or from third-party services utilized by the users.

In some embodiments, tracked activity data may also include activity data that is associated with one or more products. For example, the activity data manager 110 can identify when activity is related in some way to one or more products or product categories. When activity data is associated with a product or category, the activity data may be identified more particularly as product activity data. In other words, product activity data may be a subset of activity data and may correspond to a product or product category.

Product activity data may include when a user in the social networking system visits a product page, "likes" a product, shares a product with co-users, or provides a post related to a particular product or product category, such as "What type of running shoes should I buy?" To further illustrate, product activity data may represent when a user mentions a product in a social networking communication (e.g., a post, a comment, a message), when a user belongs to a social networking group related to a product, when a user visits a physical location (e.g., "checks in" to a brick-and-mortar store) related to a product, when a user follows a social networking page/profile associated with a product, when a user views or visits a social networking page (e.g., social networking group) or when a user interacts with other social networking content associated with a product, etc.

As briefly described above, activity data, including product activity data, may be stored for subsequent use by the social networking system 104 (e.g., stored in the storage manager 120 as activity data 122). Further, the activity data manager 110 may store activity data within a graph of data, within the social networking system 104, as will be explained in more detail below. Furthermore, the activity data manager 110 can update one or more user profiles (e.g., user nodes) in a social graph based on a user's activity, to indicate relationships with and/or interests in one or more products or product categories.

As mentioned above, the illustrated embodiment of the social networking system 104 includes the product interest detector 112. The product interest detector 112 can detect when a user (e.g., user 106a) exhibits interest in a product or product category. The product interest detector 112 may actively monitor a user's activity to identify the user interest in a product or product category. Alternatively, the product interest detector 112 can passively wait for a user to inform the product interest detector 112 that the user is interested in a product or product category.

In some example embodiments, the product interest detector 112 can determine user interest based on a user's activity data. For example, the product interest detector 112 can obtain the activity data for a user from the storage manager 120. In addition, the product interest detector 112 can identify product activity data within the retrieved activity data. For example, the product interest detector 112 may identify from product activity data that the user 106a "liked" a particular product. As another example, the product interest detector 112 may detect, from product activity data associated with the user 106a, that the user 106a visited one or more product pages for a particular printer on a number of third-party websites. Accordingly, the product interest detector 112 can detect and identify a user's interest in a product or product category based on product activity data or other user activity.

Upon detecting a user's interest in a product or product category, the product interest detector 112 can prompt a user to determine if the user wants to send a product information request to co-users, such as co-users that the user may know. For example, in response to an activity by the user 106a indicating an interest in a particular product (e.g., "liking" content associated with the particular product, sharing a link to a web page associated with the particular product, mentioning or tagging the particular product in a post or comment, etc.), the product interest detector 112 may ask the user 106a if he/she is interested in creating and sending a product information request related to the particular product to co-users. For example, in response to the detected activity related to the particular product, the product interest detector 112 may present a question or invitation regarding a product information request (e.g., "Would you like to know what your friends think about this product?" or "Ask your social network about this product.") along with one or more selectable options for responding to the prompt and/or initiating the product information request. Additional user activities that may trigger a product information request include visiting a profile page for a product, viewing content (e.g., an image) associated with a product, shopping for a product, "liking" a social networking communication related to a product, commenting on a post related to a product, membership in a group related to a product, or any other activity that indicates that a user may be interested in a product.

In some embodiments, the product-related activity of the user 106a may occur outside of social networking system 104. In such embodiments, product interest detector 112 may wait until the next time the user 106a logs into social networking system 104 or uses an application (e.g., a mobile application) associated with social networking system 104, at which time product interest detector 112 can prompt the user 106a to initiate a product information request.

The product interest detector 112 may prompt a user regarding a product information request in a variety of ways. For example, the product interest detector 112 can provide a post in the user's 106a newsfeed, identifying the product or product category in which the user 106a has shown interest, and asking whether the user 106a would like to ask co-users in the social networking system 104 about the product or product category. Alternatively, the product interest detector 112 can display a message upon detecting that the user 106a is interested in a product or product category (e.g., upon detecting user activity indicating interest in the product or product category). One will appreciate that the product interest detector 112 can use a variety of additional or alternative methods to prompt the user 106a to send a product information request to selected users.

As a further embodiment, the product interest detector 112 may provide one or more options for initiating a product information request within a profile page for a product or category of products. Thus, as the user 106a visits a product-specific profile page, the user 106a may be presented with one or more selectable options (e.g., graphical buttons or other graphical control elements) for initiating a product information request related to the particular product. For example, within the product profile page, the product interest detector 112 can include a selectable button and instructions for the user 106a to select the button to "Ask Your Friends About This Product."

In some embodiments, the user 106a can initiate a product information request absent a determination of interest by the product interest detector 112. As such, the user can manually associate the product information request with a corresponding product or group of products. To illustrate, the product interest detector 112 can assist the user 106a in identifying a product or product category for which the user 106a would like additional product information. For example, the product interest detector 112 can provide searching functionality that allows the user 106a to search an open graph for one or more products or product categories, as described below.

In further embodiments, the user 106a may initiate a product information request by accessing a web page (e.g., using a browser application) or set of options (e.g., using a mobile application) dedicated to product information requests. To illustrate, product interest detector 112 can provide a dedicated web page with one or more options for initiating a product information request (e.g., a link on the social networking system 104 that says "Send out a product information request."). The dedicated web page may include one or more selectable options and/or fillable fields for initiating the product information request.

As mentioned above, the illustrated embodiment of the social networking system 104 includes a group manager 114. The group manager 114 can assist the user 106a in selecting co-users 106b-n that will receive a product information request. The group manager 114 can then include the selected co-users 106b-n in the group 130. In some example embodiments, the group manager 114 may select co-users 106b-n from within the social networking system 104. Additionally or alternatively, the group manager 114 may select users from outside of the social networking system 104, such as product experts, product sellers, or other users not associated with the social networking system 104, to include in the group 130.

In some example embodiments, the group manager 114 may select which users to include in the group 130 based on user input. For example, the user 106a may indicate that she would like to obtain product feedback (e.g., advice, opinions, ratings, etc.,) from a particular group of co-users, such as family members, co-workers, members of a particular social networking group, etc. The user 106a may select co-users individually (e.g., one by one) or as groups (e.g., all "Friends" or "Friends of Friends"). For instance, the user 106a may want to ask her co-workers which smartphone best integrates into their work environment. In response to corresponding instructions from the user 106a, the group manager 114 may select co-users who work with the user 106a to include in the group 130.

In some examples, the group manager 114 may provide the user 106a a graphical user interface to include one or more options for the user 106a to select co-users for inclusion in the group 130. To illustrate, the group manager 114 may provide the user one or more selectable options for including a co-user or group of co-users in the group 130, a search option that the user 106a can use to search for and select co-users for inclusion in the group, form fillable fields that the user 106a can use to input contact or identification information for co-users to include in the group 130, and/or any other options for adding co-users to the group 130.

The group manager 114 can assist the user 106a to include or exclude co-users in the group 130 based on the experience and qualifications of the co-users. For instance, in the above example, the group manager 114 may include the user's co-workers in the group 130 so that the user 106a can send a product interest detector 112 to ask questions about a particular product as it relates to their work environment, because co-workers may have experience with the product in the work environment. Similarly, the group manager 114 can exclude co-users from the group 130 who may not provide relevant feedback, such as the user's 106a friends and family members, because these co-users do not have the requisite experience to provide relevant product information.

In some embodiments, the group manager 114 can provide one or more suggestions to the user 106a for selecting co-users to include in the group 130. Suggestions for including co-users in the group 130 may be based on a variety of factors. For example, suggestions for including co-users in the group 130 may be based on one or more social networking connections between the user 106a and the suggested co-users. In other words, the group manager 114 may suggest co-users that already have an apparent relationship (e.g., based on a social graph connection) with the user 106a, because the user 106a is more likely to trust the input of co-users that the user 106a knows (e.g., friends of the user 106a), or other co-users that are connected to co-users that the user 106a knows (e.g., friends of friends of the user 106a). In particular, a suggestion to include a user in the group 130 may be based on a threshold or maximum degree of separation between the user 106a and the co-users 106b-n within a social graph. Thus, the group manager 114 can suggest co-users that are directly connected to the user 106a (e.g., separated by a single degree of separation) or users that are indirectly connected to the user 106a by multiple degrees of separation, such as two or three degrees of separation, as described below. In some embodiments, the greater the degree of separation between the user 106a and co-users 106b-n, the less likely the group manager 114 is to suggest including the co-user in the group 130.

In additional or alternative embodiments, suggestions for including users in the group 130 may be based on similarities between the user 106a and the suggested users. For example, the group manager 114 may suggest co-users for the group 130 based on similarities of interests (e.g., product interests, music interests, vacation interests, etc.), demographic similarities (e.g., similarities in age, gender, nationality, social class, income, family situation, employment, etc.), geographic similarities (e.g., a proximity between the user's geographic location and geographic locations of the co-users, the geographic locations of where the co-users currently live, the geographic locations of the co-users' home towns/countries, the geographic locations of where the users co-visit/vacation, etc.), similarities in physical characteristics (e.g., similarities in hair color, body size/build, etc.), similarities in product ownership, similarities in political affiliation/position, similarities in religious beliefs, educational similarities, similarities in group memberships (e.g., social networking groups or professional groups), similar tendencies, similarities in how the co-users respond to advertisements, similarities in content discussed by co-users within social networking system 104, and/or any other similarities between the user and co-users.

In some embodiments, the group manager 114 may weight certain similarities over others based on the relevance of the similarities to the product information request. To illustrate, similarities in physical characteristics would be more relevant to a product information request related to clothing, than to product information related to smartphones. As a further illustration, similarities in family size/situation would be more relevant to a product information request related to strollers or family vacation options, than to a product information request related to car stereos or dry cleaning services. By weighting similarities based on relevance to the product information request, the group manager 114 can identify co-users that are similar to the user 106a with specific respect to the product or product category that is the subject of the product information request. Accordingly, the identified co-users (e.g., group 130) will be more likely to provide product information that the user 106a deems helpful and that is customized to the user 106a's specific situation and needs, as described above.

In addition to suggesting co-users based on similarities, the group manager 114 can suggest co-users based on an apparent experience or expertise related to the product information request. For example, the group manager 114 can identify co-users that currently own or use a product or similar product, co-users that have recently shopped for the product or a similar product, co-users that have discussed (e.g., in one or more social networking communications) the product or a similar product, co-users that have previously sent or responded to product information requests related to the product (e.g., so the user can share information regarding the results of the previous product information request), co-users that have expressed interest in the product or a similar product, users that have provided previous reviews or recommendations related to the product, co-users that have been recognized as experts with respect to the product, users that are members of a group (e.g., a social networking group, a club, a professional organization, etc.) related to the product, co-users having employment experience related to the product, co-users having an education related to the product, and/or any co-users having an apparent experience with or expertise related to the product.

To illustrate, if a product information request relates to a particular book, the group manager 114 may suggest a co-user that works at a bookstore, a co-user that has an education in literature or a topic related to the book, and/or a co-user that is a member of a book club. As a further illustration, if a product information request relates to particular smartphone, the group manager 114 may suggest a co-user that owns the smartphone, a co-user that owns a competing smartphone, a co-user that recently sent a product information request regarding smartphones, and/or a co-user from a social networking group that often discusses smartphone technologies. Accordingly, the group manager 114 can suggest co-users that are most likely to have information based on actual experience and/or expertise related to the product information request.

In some embodiments, with each co-user suggestion, the group manager 114 can indicate one or more reasons for suggesting the co-user to the user 106a. For example, the group manager 114 can identify relevant experience of the co-user, similarities between the co-user and the user 106a, relevant product ownership of the co-user, relevant social networking activity of the co-user, or any other reasons upon which the suggestion is based. Accordingly, the user 106a can make a more informed decision as to whether or not to include a suggested co-user in the group 130. This may be important if the basis for suggesting a particular co-user is not consistent with what the user 106a deems important, either generally or with specific relation to the product information request.

Additionally or alternatively, the group manager 114 can adapt its suggestions over time based on a user's treatment of previous suggestions. For example, the group manager 114 can infer which factors for suggesting co-users are more important to the user 106a based on the factors/reasons for suggesting co-users that the user 106a decides to include in target groups of co-users and the factors/reasons for suggesting co-users that the user 106a decides not to include in target groups of co-users. By identifying the factors that appear to be most important to the user 106a with respect to including co-users in the group 130, the group manager 114 can subsequently weight the identified factors over other factors.

To illustrate, the group manager 114 may determine over time that the user 106a is more interested in sending product information requests to co-users having a close social connection with the user 106a (e.g., users that are friends of the user 106a) and/or having similar interests as the user 106a, than sending product information requests to co-users having an apparent expertise or experience related to the product information requests. Accordingly, when determining what co-users to suggest going forward, the group manager 114 can weight factors related to social connections and/or similarities more heavily than factors related to experience and/or expertise. As such, the group manager 114 can further adapt to the user 106a over time to provide a more customized experience for the user 106a.

Additional or alternative factors for suggesting co-users may include co-user popularity (e.g., based on a number of "likes" or comments a co-user's product reviews receive), activity frequency (e.g., how often a co-user conducts activity related to a product), activity quantity (e.g., a total number of the co-user's activities related to a product), activity recency (e.g., how recently the co-user performed an activity related to a product), approval rating (e.g., whether other co-users approve of a co-user's product reviews and/or find a co-user's product reviews to be helpful), etc.

The group manager 114 can consider one or more (e.g., all) of the foregoing factors when identifying co-users to suggest for inclusion in the group 130. In particular, the group manager 114 can generate a score for each of a plurality of potential suggested co-users based on the foregoing factors. Furthermore, the group manager 114 can weight the factors based on the relevance of the factors to a particular product information request or requesting user. Once the group manager 114 generates the scores for each of the co-users, the group manager 114 can rank the co-users based on the generated scores, and then suggest one or more of the co-users for inclusion in the group 130 based on their scores/rankings. The group manager 114 can make suggestions specific to individual co-users and/or can group suggested co-users together (e.g., based on any suitable criteria for grouping the co-users).

After identifying one or more suggested co-users, the group manager 114 can present the suggested co-users to the user 106a along with one or more options for selecting the co-users to include in the group 130. To illustrate, the group manager 114 can present a list of the suggested co-users or user groups within a graphical user interface along with one or more selectable options (e.g., check boxes or radio buttons) for choosing which of the suggested co-users to include in the group 130. The group manager 114 can also provide one or more options for manually identifying co-users (e.g., co-users that the group manager 114 did not suggest) to include in the group 130. For example, the group manager 114 can provide a fillable field within a graphical user interface for the user 106a to manually identify (e.g., by a name, username, or other unique identifier) and/or search for co-users to include in the group 130. Thereafter, the user 106a can select which co-users (suggested or not) to include in the group 130 using the options and suggestions provided by the group manager 114.

In some example embodiments, the user 106a may select multiple groups of co-users, to which the user 106a wants to send a product information request. To illustrate, a first selected group of co-users may include "friends" of the user, a second selected group of co-users may include "friends of friends," and a third selected group may include all users of the social networking system 104. In this manner, the user 106a can then view product information corresponding to each selected group of co-users, as described below.

In one or more embodiments, a user can provide user preferences to the group manager 114 regarding which co-users to include in the group 130. For example, the user 106a may specify that the group manager 114 include and/or exclude a particular co-user or co-users when identifying groups 130. In addition, the group manager 114 can select co-users based on previous user selection habits, as described above. Alternatively, the group manager 114 may use default settings when determining which users to include in groups 130.

The group manager 114 can dynamically add or remove a co-user from a group of co-users. The group manager 114 may add or remove a co-user from a group based on the co-user's association with the user 106a. For example, if the user 106a "unfired" (e.g., breaks the social networking connection) with the co-user, the group manager 114 can exclude the co-user from a group 130 in which the co-user was previously included. Similarly, the group manager 114 can add additional co-users to the group 130 when a social networking connection is established between the co-user and the user 106b.

As further illustrated by FIG. 1, the illustrated embodiment of social networking system 104 includes a product data manager 116. In some example embodiments, the product data manager 116 can facilitate the generation and customization of a product information request. In addition, the product data manager 116 may assist a user in sending a product information request to co-users of social networking system 104 (e.g., the group 130).

The product data manager 116 may assist the user 106a to configure one or more parameters of the product information request. In some embodiments, the product data manager 116 may prompt the user to provide input regarding the specifics of the product information request. For example, the product data manager 116 can provide multiple selectable options for the user 106a to structure the product information request. To illustrate, the product data manager 116 may provide options for the user 106a to select one or more products or product categories that will be the subject of the product information request and select one or more specific request components to include in the product information request. Example request components include, without limitation, one or more questions regarding one or more products, a request for one or more ratings (e.g., a star rating) of one or more products, a request for recommendations regarding one or more products, a request for reviews of one or more products, selectable options (e.g., control elements, graphical buttons, radio buttons) for responding to the product information request, content (e.g., product images, product descriptions, URLs for product web pages, etc.) to present within the product information request, and/or any other suitable request components to include in the product information request.

In some embodiments, the product data manager 116 may present various predefined components (e.g., predefined questions or requests for information) that the user 106a may select to include in the product information request. Accordingly, very little effort may be required from the user to structure and select components for inclusion in the product information request. Additionally or alternatively, the product data manager 116 may allow the user 106a to completely customize and/or create the components of the product information request. For example, the user may manually create a multiple-choice question (e.g., by typing the question in a question field) and create multiple possible answers for the question (e.g., by typing the multiple possible answers into corresponding answer fields). Similarly, the user can manually attach one or more product images and/or provide a hyperlink to a product web page for inclusion in the product information request. In sum, the user 106a can create a product information request by selecting one or more predefined components suggested by the product data manager 116 and/or manually creating one or more components with the assistance of product data manager 116, all of which may be designed to elicit product information from recipients of the product information request.

In further embodiments, the product data manager 116 can automatically generate and distribute one or more product information requests to users independent of a request being initiated by a user of social networking system 104. For example, the product data manager 116 may automatically generate and distribute a product information request to obtain missing or incomplete product information for a particular product or product group. Additionally or alternatively, the product data manager 116 may randomly or sequentially reach out to users throughout the social networking system 104 and across multiple social networks and ask these users to rate and/or review an increasing list of products and services. As ratings and reviews are received, the storage manager 120 may aggregate the information and correlate the information across products and social users within one or more databases (e.g., stored as activity data 122, product data 124, node data 126, and edge data 128) of the social networking system 104.

Once the group manager 114 has selected one or more groups of co-users (e.g., the group 130) based on user input, and the product data manager 116 has generated a product information request, the product data manager 116 can send, broadcast, or otherwise distribute the product information request to each member of the group 130. The product data manager 116 can provide the product information request to the group 130 in any suitable manner(s). For example, the product data manager 116 can provide a notification (e.g., a push notification, a pop-up notification, an audible alert, a visual alert, etc.) to each member of group 130 to notify the members of the product information request. In some embodiments, the group 130 can interact with the notification (e.g., click on or tap the notification) to access the product information request.

In additional or alternative embodiments, the product data manager 116 can send an electronic message (e.g., an email, an instant message, an SMS message, etc.) regarding the product information request to one or more members of the group 130. The electronic message can include information regarding the product information request, the product information request itself, a link to the product information request, and/or instructions for accessing and responding to the product information request.

In yet additional or alternative embodiments, the product data manager 116 can provide the product information request within newsfeeds (e.g., social networking newsfeeds) of the members of the group 130. For example, the product data manager 116 can provide an indication of the product information request, a link to the product information request, and/or the product information request itself within a newsfeed. The recipient of the product information request can then interact with the product information request and the options included therein by providing user input representing the recipient's response to the product information request. For example, the recipient can input text into one or more fields in response to a question or other query, select (e.g., click on or tap) one or more selectable control elements for choosing an answer, providing a rating, and/or recommending a product, and/or provide any other user input representative of the recipient's response(s) to the product information request.

In addition to obtaining product information through product information requests, the product data manager 116 can obtain product activity data and product information in additional or alternative ways. As used herein, the terms "product information" and "product data" each generally refer to any information, media, and/or other data associated with a product. For example, product information for a particular product can include a name of the product, a description of the product, an identification of one or more merchants that provide the product, specifications for the product, price information for the product, images of the product, videos of the product, an identification of users that own or use the product, an identification of users that want the product, a URL address for a website associated with the product, a product category associated with the product, an identification of one or more related products, one or more recommendations or reviews of the product, one or more ratings of the product, options (e.g., size options, color options, shipping options, purchase options) for the product, a manufacturer of the product, or any other information associated with the product. In many cases, product activity data (e.g., activity data 122) is linked to product information (e.g., product data 124). For example, product activity data can be linked to a user associated with the corresponding activity. To illustrate, product activity data may represent a rating of a product (e.g., a user activity) and can be linked to the user that provides the rating.

To illustrate, if a user or co-user uploads an image, the act of uploading the image can be stored as product activity data. The product activity data can be linked to product information that may include the filename, size, date uploaded, the user who uploaded the image, users tagged in the image, a URL link to where the image is stored, and/or the image resolution of the image. In addition, the product information can include what type of digital camera was used to take the image, which may be stored in the metadata of the image along with other information linking the image to the product.

The product data manager 116 can further obtain product activity data and product information in a variety of ways. For example, the product data manager 116 may obtain product activity data for a user from the activity data manager 110. For example, the activity data manager 110 can provide the product data manager 116 with product activity data, such as data representative of likes, ratings, and/or reviews of products by users of the social networking system 104. Similarly, the product data manager 116 may access product information (e.g., product data 124) stored by way of storage manager 120.

In some embodiments, product information may be provided by co-users in response to a user's product information request. For example, the product data manager 116 can receive responses to one or more product information requests and can obtain product information from the received responses. In particular, the product data manager 116 can receive recommendations, ratings, and/or reviews from the group 130 in response to a product information request. The product data manager 116 can then store the responses, for example, in a table or database associated with the user and/or the product. In addition, the product data manager 116 can make the product information available for the benefit of the users of the social networking system 104.

The product data manager 116 can also obtain produce information in a variety of ways. For example, the product data manager 116 may obtain product activity data for a user from the activity data manager 110. For example, the activity data manager 110 can provide the product data manager 116 with product activity data, such as when a user recommended, liked, rated, or reviewed a product. Similarly, the product data manager 116 may access product data 124 stored by the storage manager 120.

The product data manager 116 can also obtain product information from one or more third-party sources. For example, the product data manager 116 can receive one or more product feeds from one or more providers of product information. In additional embodiments, the product data manager 116 can "scrape" or "harvest" product information from one or more third-party websites (e.g., ecommerce websites). For example, the product data manager 116 can utilize a URL received from a user of social networking system 104 (e.g., a URL shared by the user in a social networking post) or a merchant (e.g., a URL to the merchant's website) and then scrape any product information available by way of the received URL. In yet further embodiments, the product data manager 116 can receive product information by way of one or more user interfaces that facilitate the input of product data by merchants wishing to market their products by way of the social networking system 104.

In some embodiments, the product data manager 116 can obtain product information from one or more users having an apparent expertise related to one or more products. In some embodiments, these "experts" may be co-users of and provide product information by way of the social networking system 104. For example, the product data manager 116 can identify expert co-users based on their social networking activity. To illustrate, based on a quantity or quality of communications (e.g., posts, comments, etc.) related to a particular product, the product data manager 116 may label the corresponding co-user as an expert for the particular product and obtain product data from the co-user with respect to the particular product.

In additional embodiments, the product data manager 116 may identify a defined user group dedicated or otherwise related to a particular product or product category (e.g., based on a name of the group, a description of the group, or communications between members of the group), and obtain product data from the user group for the particular product or product category. Additionally or alternatively, the product data manager 116 can obtain product data from known third-party experts. For example, the product data manager 116 might access product reviews provided on third-party websites, such as CNET. In some embodiments, the product data manager 116 may utilize product data obtained from experts more broadly and uniformly than product information specific to particular co-users of the social networking system 104.

With so much data related to so many users and products, the product data manager 116 may combine, organize, or correlate data intelligently so that the data may be used in a customized manner to benefit the users of the social networking system 104. As a result, the product data manager 116 can quickly identify a subset of the data that is relevant to a particular user and/or product. The product data manager 116 may store records of users (e.g., the user 106a and co-users 106b-n), products, and relationships between users and/or products in a social graph comprising a plurality of nodes (stored as node data 126) and a plurality of edges connecting the nodes (stored as edge data 128).

The social graph may comprise a plurality of user nodes. A user node of the social graph may correspond to and include data associated with a user of the social-networking social networking system 104. As described above, a user may be an individual (human user), an entity (e.g., an enterprise, business, or third-party application), or a group (e.g., of individuals or entities). A user node corresponding to a user may comprise information provided by the user and information gathered by various systems, including the social-networking social networking system 104. For example, the user may provide his or her name, profile picture, city of residence, contact information, birth date, gender, marital status, family status, employment, educational background, preferences, interests, and other demographic information to be included in the user node. Each user node of the social graph may correspond to a web page (typically known as a "profile page") associated with the corresponding user. For example, the social-networking social networking system 104 can access a user node corresponding to the user and construct a profile page including the user's name, a profile picture, and other information associated with the user. A profile page may include all or a portion of the information stored within a user's node based on one or more privacy settings or other configurable settings.

The social graph may also include a plurality of product nodes. Each product node may correspond to a particular product or a group of products. A product node can include any suitable product information or data associated with a product, as described above. In addition, a product node can include an identification of users that "like" the product, an identification of users that have otherwise expressed interest in or interacted with the product, a URL address for a website associated with the product and other social networking information associated with the product. Similar to user nodes, each product node of the social graph may correspond to a web page or "profile page" where users can access the corresponding product information. For example, the social networking system 104 can access a product node corresponding to a product, and construct a profile page (e.g., viewable by way of a browser or mobile application) including product information from the product node.

In some embodiments, a user may reference a particular user node or product node within a social networking communication. For example, a user can include a "tag" to a node within a social networking post or comment. The tag may serve as or include a link to a profile page for the tagged node. To illustrate, a tag for a product node representing a particular product may serve as a link to a profile page for the product. Accordingly, once a user has inserted a tag in a post or other communication, the user or co-users can use (e.g., select) the tag to access the profile page for the tagged product. In some embodiments, the tag can include text, such as the name of the tagged product. Additionally or alternatively, the text of the tag can be visually distinguishable from other text in the communication. For example, the text of the tag can be bolded, underlined, italicized, in all caps, a different color than the other text, a different size than the other text, a different font type than the other text, and/or visually distinguishable in some other manner. Furthermore, the tag can include any other content (e.g., an image or an icon) associated with the tagged node.

In some embodiments, the product data manager 116 can assist a user to include a tag in a communication. For example, the product data manager 116 may detect that a user is typing a string of characters into a communication, search the product nodes for one or more nodes matching the string of characters (e.g., nodes with associated names matching the string of characters), and present one or more matching nodes to the user. In particular, the product data manager 116 can present a list of matching nodes (e.g., within a drop-down list or window) below or nearby the typed string of characters. Furthermore, the product data manager 116 can update the search for nodes and the list of matching nodes as the user continues to type. At any point, the user can select one of the listed nodes to include a tag for the node in the communication.

To illustrate, as a user begins typing the name of a product in a communication, the product data manager 116 can search for products (e.g., products represented by product nodes in the social graph) having a name that matches the name or portion of name typed by the user, and provide a list of the matching products to the user. The user can then select the intended product from the list of matching products. The product data manager 116 can insert a tag representing the product into the communication in response to the detected selection. Thereafter, users may select or otherwise interact with the tag to access a profile page for the tagged product. Additionally or alternatively, the product data manager 116 can associate the communication and/or any related activities (e.g., likes, comments, replies) to the product node representing the product. In particular, the product data manager 116 can associate user nodes with the product node (e.g., by way of one or more edges connecting the user nodes and the product node) based on the activities of the users with respect to the communication including the tag.

With a social graph, an edge between a pair of nodes may represent a relationship between the pair of nodes. For example, an edge between two user nodes can represent a friendship between the two users. As another example, an edge between a user node and a product node can represent a relationship between a user and a product (e.g., that the user likes, uses, or owns the product) or an interaction between the user and the product (e.g., that the user mentioned the product, shopped for the product, viewed a profile page for the product, etc.). As a further example, an edge between two product nodes can represent a relationship between two products (e.g., that the products are in a common product category, that the products are often purchased together, that users interested in one product are often interested in the other product, that the products share one or more common attributes, etc.). Furthermore, an edge between a product node and a product group node (e.g., a product node for a group or category of products as opposed to a single product) may represent that the product belongs to the product group.

Edges between user nodes and product nodes may be based on social networking activity data obtained by the activity data manager 110. In particular, if a piece of social networking activity data obtained by the activity data manager 110 indicates an interaction between a user and a product, the product data manager 116 may create an edge between a user node associated with the user and a product node associated with the product to represent the piece of social networking activity of the user. In particular, the product data manager 116 may generate an edge between a user node and a product node to represent any social networking activity related to a particular product or product category, examples of which are discussed herein in more detail.

The degree of separation between any two nodes is defined as the minimum number of "hops" required to traverse the social graph from one node to the other. A degree of separation between two nodes can be considered a measure of relatedness between the users or the products represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be referred to as "friends of friends." Degrees of separation apply equally to relationships between user nodes and product nodes. For example, a user node being connected to a product node by a single degree of separation may indicate a closer relationship or greater product interest than a connection by multiple degrees of separation. The more degrees of separation between a user node and a product node may indicate a lower likelihood of interest by the user in the corresponding product.

Furthermore, a connection between a user node and a product node by way of another user node may indicate a likelihood of interest in the product because the user is connected to another user that is connected to the product in some way. To illustrate, a user interested in purchasing a new smartphone may be interested to learn what smartphones are used by the user's friends or friends of friends. Accordingly, connections between a user node and a product node by way of one or more other user nodes may be particularly helpful to a user researching product information.

In further embodiments, the product data manager 116 may prompt a user for information regarding a product or product category. For example, the product data manager 116 may ask the user 106a to rate a product that the user has expressed interest in. For instance, the product data manager 116 may detect that the user 106a is accessing the social networking system 104 using a new tablet. The product data manager 116 may then ask the user 106a to rate the tablet. Further, if the detected product is associated with a product, for which the user 106a previously sent a product information request to the group 130, the product manager 204 can notify the group 130 that the user 106a purchased the particular product.

As mentioned above, social networking system 104 also includes the product presentation manager 118, which can organize, format, summarize, customize, and/or manage the presentation of product information to one or more co-users. For example, once the members of the group 130 provide responses to a product information request, the product presentation manager 118 may organize the responses and provide a summary of the responses to the user 106a and/or one or more co-users (e.g., members of the group 130, friends of the user 106a, and/or to a more general or public audience of users).

The product presentation manager 118 can provide product information (e.g., based on results of a product information request or based on independent product information gathering) to users (e.g., the user 106a and co-users 106b-n) in a number of ways. For example, the product presentation manager 118 may present a results summary within a graphical user interface accessed by the user 106a. To illustrate, the product presentation manager 118 may include the results within a newsfeed associated with the user 106a, within a profile page associated with the user 106a, within a web page related to a product information request (e.g., a web page dedicated to the presentation of results of the product information request), within a web page (e.g., a profile page) related to a particular product or product category (e.g., a product that is the subject of the product information request), within a graphical user interface of a mobile application and/or in any other suitable manner. Additionally or alternatively, the product presentation manager 118 can provide product information to a user within a communication (e.g., an email, an instant message, etc.) including the product information or instructions for accessing the product information.

As mentioned above, the product presentation manager 118 can organize and/or summarize product information for presentation to a user. For example, the product presentation manager 118 can organize product information based on user similarities (e.g., grouping responses based on similarities between the users providing the responses), based on response similarities (e.g., grouping common or similar responses), based on products (e.g., grouping responses related to a first product in a first group and responses related to a second product in a second group), based on time (e.g., grouping responses based on when they were received), based on user subgroups (e.g., grouping responses from each subgroup together, such as friends, family, co-workers, neighbors, etc.). Further, in displaying product information, the product presentation manager 118 can present product descriptions, reviews, recommendations, availability, etc.

The product presentation manager 118 can present results of the product information request in a variety of ways. For example, the product presentation manager 118 may provide graphical comparisons of products in the summary, such as percentage breakdowns, star ratings, graphs, charts, etc., based on the product information request. For instance, the product presentation manager 118 may present a pie chart or a bar graph displaying results of which smartphones co-users recommend, based on a user's product information request. Additionally, the product presentation manager 118 can associate co-users with products each co-user recommends to the user. For example, the product presentation manager 118 can place a co-user icon of each co-user next to a product the co-user recommends. Alternatively, the product presentation manager 118 can place a co-user icon next to each product that the respective co-user has used or purchased. FIGS. 4-7 below illustrate and discuss various examples of product information summaries that the product presentation manager 118 can present.

In addition, as described in detail below, the user 106a can interact with the product information summary. For instance, the user 106a can filter, modify, or share results within the summary of product information. As one example, the user can select different subgroups (e.g., "friends," friends of friends," "co-workers," etc.) within the product information summary such that the product presentation manager 118 provides results based on the subgroup. In addition, the user 106a can select co-users to ask for additional information about a specific product using the product information summary. Further, in some example embodiments, the user 106a can exclude co-users from the product information summary. Additional detail regarding user interaction with the product information summary is described below.

In some embodiments, the product presentation manager 118 can update a presentation of product information as additional relevant product information is obtained. For example, the product presentation manager 118 can update a presentation of product information periodically (e.g., every minute, every hour, every day, etc.), continuously (e.g., in real time), based on a user action (e.g., an update request or an access of the presentation), upon receipt of additional product information, and/or upon the occurrence of any other trigger. To illustrate, if a presentation of product information is based on a corresponding product information request sent to the group 130, the product presentation manager 118 may begin to present the results of the product information request as soon as a response or a threshold number of responses (e.g., five responses or ten responses) are received from the group 130. Thereafter, the product presentation manager 118 may update the presentation of product information each time an additional response is received or each time a threshold number of additional responses are received.

In updating the product information presentation, and in addition to adding the newly received product information to the previously received product information, the product presentation manager 118 may also rearrange or reorganize the presentation of product information. For example, if a presentation of product information is ranked based on, for example, the sums of common responses to a particular question, the product presentation manager 118 may re-rank the presentation if the newly received product information causes the sum of responses for a first response to exceed the sum of responses for a second response. By updating the product information presentation in this, and other ways, the product presentation manager 118 can dynamically adapt a presentation of product information to represent the most recently available product information and to reflect the effects of recently obtained product information on the overall analysis of the product information. Accordingly, the product presentation manager 118 provides a "living" presentation of product information that is repeatedly updated to represent both the granular effects of newly obtained data (e.g., effects on a particular aspect or component of the presentation) as well as the overarching effects of newly obtained data (e.g., effects on an overall analysis or comparison represented by the presentation).

Although the present disclosure discusses various embodiments in which a presentation of product information is based, at least in part, on responses to a product information request initiated by a user, one will appreciate that the product presentation manager 118 can organize and present product information to a user independent of a product information request. Accordingly, as will now be described in additional detail, the social networking system 104 can present product information to the user 106a absent a product information request being initiated by the user 106a (e.g., upon detecting user interest in a product or product category). In particular, the activity data manager 110 can track and store user activities in connection with a user's interest in a particular product. Further, the product interest detector 112 can detect a user's interest in a product or product category (e.g., based on the user's activities). The group manager 114 can identify one or more groups of co-users connected to the user by way of the social networking system 104. The product data manager 116 can identify product information associated with the product or product category of interest to the user and/or associated with a group of co-users associated with the user. The product presentation manager 118 can generate a product presentation based on the identified product information and provide the product presentation to a user, as described in more detail herein.

The activity data manager 110, as described above, can detect, receive, retrieve, and otherwise track activity data for users of the social networking system 104. The activity data can include product activity date (e.g., activity data associated with a particular product). As explained above, product activity data may include data representative of when a user in the social networking system 104 visits a product page, "likes" a product, shares a product (e.g., shares an image of the product or shares a link to a web page for the product) with co-users, provides a post related to a particular product or product category (e.g., a post including the question, "What type of running shoes should I buy?"), and/or performs any other suitable activity associated with a product or product category.

Referring now to the product interest detector 112, as described above, the product interest detector 112 can detect an indication of interest by a user in a product or product category. In some example embodiments, the product interest detector 112 can analyze user activities tracked by the activity data manager 110 to detect when the activities of a user (e.g., the user 106a) indicate interest in a product or product category. For example, the product interest detector 112 can detect an indication of interest based on one or more "likes," messages, tags, posts, shares, comments, recommendations, ratings, reviews, communications, invites, connections, or content views (e.g., views of profile pages, pictures, communications, etc.) associated with a product or product category. Alternatively, the activity data manager 110 can notify the product interest detector 112 when the activity data manager 110 detects user activity 122 in connection with a product or product category.

In one or more embodiments, the product interest detector 112 can detect an indication of interest based on a determination that a user's interest in a product or product category meets or exceeds a threshold interest level (e.g., based on a threshold interest score and/or a threshold number of activities associated with the product or product category). When a user's interest in a particular product or product category meets or surpasses the threshold interest level, the product interest detector 112 can send an indication to the group manager 114, the product data manager 116, and/or the product presentation manager 118 indicating that the user 106a is interested in a particular product or category, as described below. For example, the product interest detector 112 can inform the group manager 114 to identify one or more groups of co-users associated with the user 106a and the product or product category. As a further example, the product interest detector 112 may inform the product data manager 116 of the particular product or product category in which the user 106a is interested.

The product interest detector 112 may use a number of factors to determine whether a user's level of interest exceeds a threshold interest level. For example, the product interest detector 112 may determine a user's level of interest based on the number and/or frequency of activities associated with a particular product. For instance, the product interest detector 112 can monitor product activity data for a user over a period of time (e.g., a week, a month, a year, etc.) to determine a number or frequency of the user's activities related to a particular product. Once a number and/or frequency of activities associated with a particular product meets a corresponding threshold, the product interest detector 112 may determine that the user is interested in the product. In some cases, a single activity associated with a product may be sufficient to trigger an indication of interest by the user in the product. For example, a single visit to a product's profile page may be sufficient to indicate the user's interest in the product.

As another example, the product interest detector 112 can determine a user's interest level in a product or product category based on product data activity type. In other words, some types of activities may represent a stronger indication of interest or may be weighted more heavily in determining interest than others. For instance, some user activities such as visiting a profile page associated with a product, explicitly mentioning the product in a social networking communication, or shopping for the product on an ecommerce website may represent a stronger indication of interest in the product than other user activities, such as "liking" an image of the product or shopping at a store that happens to offer the product without actually shopping for the product. Accordingly, the product interest detector 112 may assign different weights, scores, or strengths to different types activities when determining whether the user activities are sufficient to indicate interest in a particular product.

Additionally, the product interest detector 112 may determine a user's interest level in a product or product category based on a combination of product activities types. For example, if a user displays interest in a product through multiple activities (e.g., "likes" a product and mentions the product in a post) or a minimum number of activities (e.g., four activities in a month), the product interest detector 112 may determine that the activities, in the aggregate, satisfy a threshold interest level in the product.

More specifically, each product activity may be assigned a score. The product interest detector 112 can aggregate the scores for all of a user's activities associated with a particular product to determine whether the aggregated score meets or exceeds an interest score threshold. In some examples, the threshold score necessary to indicate interest in a product may be consistent across multiple users and/or products. Additionally or alternatively, the product interest detector 112 may assign different score thresholds to different users and/or products depending on the specific circumstances and/or details associated with the users and/or products. In yet further embodiments, the product interest detector 112 may temporarily modify (e.g., lower) an interest score threshold associated with a particular product as part of a marketing campaign, so that the threshold is more easily met.

In accordance with the foregoing and other examples, the product interest detector 112 can detect an indication of a user's interest in a product or category of products. In response to a detected indication of interest, the social networking system 104 may aggregate, summarize, and provide a presentation of product information associated with a corresponding product or product category.

As mentioned above, the group manager 114 can select one or more groups of users to use in presenting a product presentation. In other words, the product presentation may be organized based, in part, on one or more groups of co-users of the social networking system 104. For example, the product presentation manager 118 may identify subsets of product information that are associated with corresponding groups of co-users (e.g., group 130). The product presentation manager 118 may then organize, divide, and/or present acquired product information based on the groups of co-users, to which the product information relates. For example, the product presentation manager 118 may group product information associated with "friends" in one group, product information associated with "friends of friends" in a second group, and product information associated with classmates in a third group. Accordingly, the group manager 114 may assist in identifying the group of users 130 to associate with the user and the product presentation.

As mentioned above, in response to a user's detected indication of interest in a product, the social networking system 104 can provide the user a presentation of product information associated with the product. The product data manager 116 can acquire and/or manage product information associated with the detected interest as explained in more detail above. For example, the product data manager 116 may collect product activity data for users of the social networking system 104 from users, co-users, user groups, and/or third-party sources. In particular, the product data manager 116 can identify product activity data associated with a user's friends. To illustrate, the product data manager 116 can identify which of the user's friends have rated, recommended, reviewed, "liked," shared, viewed, used, or purchased a product of interest to the user or a related product (such as a competing product). As an illustrative example, if the user 106*a* is interested in buying a new smartphone, the product data manager 116 may identify which of the user's 106*a* friends use smartphones, which type of smartphone each friend uses, whether the friend recommends the smartphone, and a total count of each smartphone used. Additionally or alternatively, the product data manager 116 may filter identified results to only particular smartphones of interest to the user 106*a*, or only new smartphones, such as smartphones that have been released in the last year. The product data manager 116 can, additionally or alternatively, obtain product information from any other suitable sources and/or in any other suitable manner, such as described herein.

In some example embodiments, the product data manager 116 can identify one or more user subgroups within the group 130 based on the co-user's connection to the product or product category. For example, the product data manager 116 can keep a count of how many co-users recommend either buying or not buying a particular product. Further, the product data manager 116 can create subgroups according to co-user ratings. For example, the product data manager 116 may group co-users that rated a product five out of five stars in one subgroup, co-users that rated the product three out of five stars in another subgroup, and co-users that did not rate the product in a third subgroup.

Once the product data manager 116 has identified product information that is relevant to a user's detected interest, the product presentation manager 118 can organize and present the identified product information to the user. As mentioned above, the product presentation manager 118 can organize, format, summarize, customize, and/or manage the presentation of product information to one or more users. For example, the product presentation manager 118 may proactively generate and provide a personalized presentation of product information to a user when the user exhibits interest in a particular product or product category. In particular, in response to a detected interest in a product or product category, the product presentation manager 118 may obtain corresponding product data 124, organize the product data 124, and provide a summary of the product data 124 to the user 106*a* and/or one or more co-users 106*b-n* (e.g., members of the group 130, friends of the user 106*a*, and/or to a more general or public audience of co-users, etc.), as described above.

In one or more embodiments, as described above, the product presentation manager 118 can organize and/or summarize the product information for presentation to a user. For example, the product presentation manager 118 can organize the product information based on user similarities (e.g., grouping based on similarities between the co-users in the group 130), based on product activity data similarities (e.g., grouping common or similar product activity data, such as grouping co-users together who "liked," used, or rated the product or product category), based on products (e.g., grouping product information related to a first product in a first group and product information related to a second product in a second group), based on time (e.g., grouping product information based on when the product information was obtained or when corresponding product activity occurred), based on subgroupings (e.g., such as a friends subgroup, a family subgroup, a co-workers subgroup, a product category subgroup, etc.).

In one or more embodiments, the product presentation manager 118 may indicate attributes about co-users within the group 130. For example, the product presentation manager 118 can highlight which co-users within the group 130 use a particular product. Further, the product presentation manager 118 may highlight a particular co-user whom a user can ask for additional information regarding the product of product category for which the user is interested. For example, as described above, the social networking system 104 can identify co-users within the group 130 based on an apparent experience or expertise related the product or product category. For instance, the product presentation manager 118 may point out that a close friend of the user 106*a* has experience with a product. As such, the product presentation manager 118 may suggest that the user 106*a* contact the close friend to get a personalized recommendation regarding the product. For example, the product presentation manager 118 may provide a selectable option to ask the close friend to provide a personal recommendation.

In some example embodiments, the product presentation manager 118 can update which co-users are identified within the group 130 based on additional product data. For example, as described above, a first user may send a product information request to co-users in the social networking system 104. Upon receiving responses to the product information request, the product presentation manager 118 can update a product presentation based on the received product information. Then, the product presentation manager 118 can provide the updated product presentation to a second user who is also interested in the same product or product category. For example, the second user may display an interest in a product after receiving the first user's product information request. Thus, results from the first user's product information request can be used to benefit both users.

As an illustrative non-limiting example, based on a detection that the user 106*a* visits a web page associated with smartphones (e.g., a social networking profile page dedicated to the product category: smartphones), the product presentation manager 118 may generate, customize, and provide a product presentation associated with smartphones to the user 106*a*. The product presentation manager 118 can also customize the product presentation for the user 106*a* (e.g., based on information associated with the user 106*a* or based on information from one or more groups of co-users associated with the user 106*a*). For example, the product presentation manager 118 may dynamically generate and present a summary (e.g., using percentage breakdowns, star ratings, graphs, charts, etc.) of what smartphones the user 106*a*'s friends own, prefer, recommend, like, have shopped for and/or use.

Additionally or alternatively, the product presentation manager 118 may customize a product presentation based on a user's recent activity. For example, and continuing with the foregoing smartphones example, the product presentation manager 118 can customize the product presentation to include product information associated with one or more smartphones the user 106*a* has recently mentioned (e.g., in a social networking communication) and/or one or more smartphones for which the user 106a has recently shopped (e.g., on one or more third-party ecommerce websites). Accordingly, in addition to the general smartphone information available within the web page, the user 106a receives product information that is specific to and customized for the user 106a based on, for example, the user's 106a recent activities.

Similarly, if another user accesses the same smartphone web page, the product presentation manager 118 can customize the web page to include customized product information customized for the other user. For example, based on the others user's social networking connections, recent activities, etc., the product presentation manager 118 may customize a product presentation for the other user. For instance, the product presentation manager 118 may provide product information for different smartphones to the other user based on the other user's recent smartphone viewing activity, on the smartphone usage of the other user's social networking connections, and/or on any other information associated with the other user. Accordingly, the product presentation manager 118 can customize a presentation of product information within a web page regardless of the visitor.

In some embodiments, the product presentation manager 118 can update a presentation of product information as additional relevant product information is obtained. For example, the product presentation manager 118 can update a presentation of product information periodically (e.g., every minute, every hour, every day, etc.), continuously (e.g., in real time), based on a user action (e.g., an update request or an access of the presentation), upon receipt of additional product information, as described above. To illustrate, the product presentation manager 118 may update the presentation of product information each time additional product data activity is obtained. In updating the product information presentation, and in addition to adding the newly received product information to the previously received product information, the product presentation manager 118 may also rearrange or reorganize the presentation of product information. For example, if a presentation of product information is ranked based on, for example, which type of digital camera is used most within co-users in the group 130, the product presentation manager 118 may re-rank the presentation if the newly received product information causes the ranking to change.

By updating the product information presentation in this, and other ways, the product presentation manager 118 can dynamically adapt a presentation of product information to represent the most recently-available product information and to reflect the effects of recently obtained product information on the overall analysis of the product information. Accordingly, as described above, the product presentation manager 118 provides an up-to-date presentation of product information that is repeatedly updated to represent both the granular effects of newly-obtained data (e.g., effects on a particular aspect or component of the presentation) as well as the overarching effects of newly-obtained data (e.g., effects on an overall analysis or comparison represented by the presentation).

In one or more embodiments, the product presentation manager 118 can present product information relating to multiple products and/or product categories. For example, the product presentation manager 118 can provide a list of top items being bought by co-users connected to a user (e.g., "friends," "friends of friends," co-workers, members of a particular group, etc.) Further, the product presentation manager 118 can provide a list of popular items among a user's social networking connections for a product category for which the user shows interest. For example, upon the user 106a showing interest in audio equipment, the product presentation manager 118 can generate a summary of audio equipment products that the user's 106a "friends" and/or co-workers have rated, recommended, used, and/or purchased. As such, the product presentation manager 118 can provide a user with personalized information in response to a user's interest in a product or product category and according to interests of co-users connected to the user via the social networking system 104.

Figures 2A, 2B:
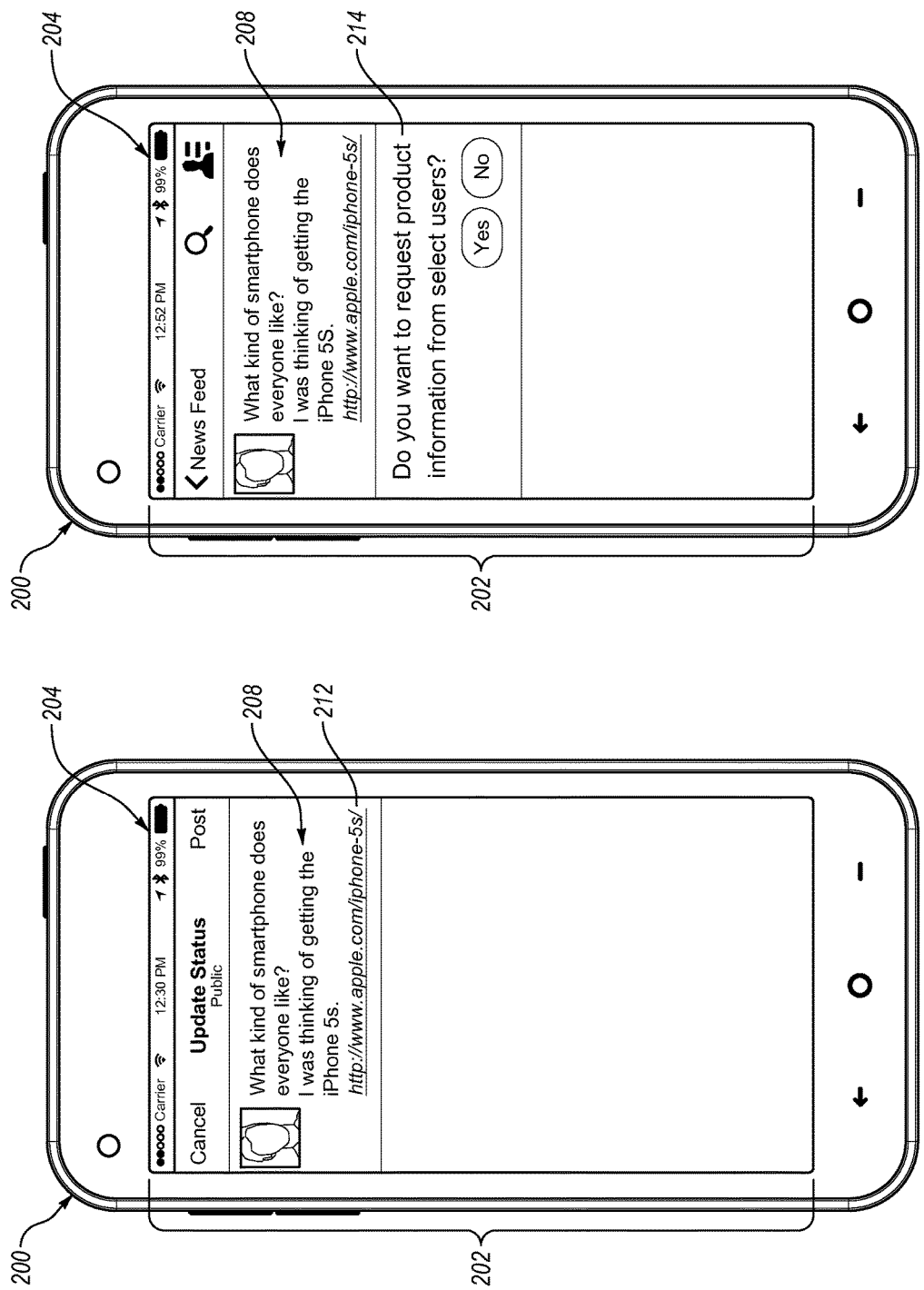
FIG. 2A illustrates an exemplary graphical user interface showing an example process of detecting a user's interest in a product in accordance with one or more embodiments.
FIG. 2B illustrates an exemplary graphical user interface showing an example process of prompting the user to initiate a product information request associated with the product in accordance with one or more embodiments.

FIGS. 2A-2B illustrate example graphical user interfaces 202 showing example processes of detecting a user's interest in a product and prompting the user to initiate a product information request associated with the product. In particular, FIGS. 2A-2B illustrate an example mobile device 200 displaying various views of a graphical user interface 202 (or "GUI 202") by way of a touch screen 204. The GUI 202 can be a graphical user interface for a social networking mobile application. For example, the mobile device 200 can execute an application that facilitates interactions with the social networking system 104 described in connection with FIG. 1.

Further, the mobile device 200 illustrated in FIGS. 2A-2B may be an example embodiment of the client device 102a described in connection with FIG. 1. For example, the user 106a may use the mobile device 200 to interact with the social networking system 104 via the mobile social networking application. Further, while the computing device of FIGS. 2A-2B illustrate the mobile device 200, one will appreciate that a social networking application may be executed on other types of computing devices, such as the computing and client devices described below in connection with FIGS. 12-13.

As illustrated in FIG. 2A, a user may utilize the mobile device 200 to write a social networking post 208 (or simply "post 208"). In particular, the user may input the post 208 by way of the GUI 202. As illustrated, the post 208 may include an inquiry as to the product within a product category co-users prefer. For example, the user may ask co-users in the post 208, "What kind of smartphone does everyone like?" In addition, the user may mention a particular product (e.g., a particular smartphone) in the post 208. To illustrate, as shown in FIG. 2A, the user mentions, "I was thinking of getting the iPhone 5S." Additionally or alternatively, the user can include additional information or content (e.g., images) in the post 208. For example, as shown in FIG. 2A, the user can include a URL 212 for a web page associated with a particular product. In yet furthermore embodiments, the user may tag a particular product in the post 208, as discussed in more detail above.

Based on the content of the post 208, the social networking system 104 may determine that the user is interested in a product category (e.g., smartphones) and/or a particular product (e.g., the iPhone 5s). For example, the product interest detector 110 may determine that the user is interested in smartphones and/or in the iPhone 5S based on the mention of "smartphone" and "iPhone 5S" in the post 208, based on the inclusion of the URL 212 in the post 208, based on the inclusion of a product or product category tag (e.g., a tag associated with a corresponding product node in a social graph) in the post 208, and/or based on any other suitable activities of the user, such as described in more detail above.

In response to a determination that a user is interested in a product or product category, the social networking system 104 may prompt the user to send a product information request to one or more co-users of the social networking system 104. For example, based on the post 208, the social networking system 104 may provide a prompt 214 to the user, as shown in FIG. 2B. The prompt 214 can include information, content, and/or options prompting the user to initiate a product information request. For example, as shown in FIG. 2B, the prompt 214 can include a question and/or one or more options (e.g., selectable buttons) for responding to the prompt 214. The question in the prompt 214 can be generic (e.g., "Would you like to request product information from your friends?") or specific to the product or product category in which the user has shown interest (i.e., "Do you want to request product information for the iPhone 5S from other users?"). The user can accept or decline the invitation in the prompt 214 to send a product information request. For example, the user can select the "Yes" button to accept or the "No" button to decline or ignore the request. If, in response to the prompt 214, the user accepts the invitation to send the product information request, the social networking system 104 can assist the user in initiating, creating, configuring, and sending the product information request, as discussed in more detail above, and as illustrated in the following figures and description.

In an alternate embodiment, based on the post 208, rather than prompting the user to send out a product information request, the social networking system 104 may provide a product presentation to the user based on the particular product and/or a product category, in which the user is interested. For example, the product presentation manager 118 can provide the user with a product presentation that includes additional information regarding smartphones and/or the iPhone 5s, such as the example product presentations shown in FIGS. 5-7. Alternatively, the social networking system 104 may inquire whether the user would like additional information corresponding to the particular product or product category. For instance, the social networking system 104 can present the question, "Would you like to know which friends use the iPhone 5s?" or "Would you like to know what types of smartphones your friends use?" In response, user may be directed to a product presentation (e.g., a smartphone information summary), which is customized for the user, as described above.

As mentioned above, the social networking system 104 can assist the user in configuring and sending a product information request to one or more co-users. To illustrate, FIG. 3 shows the mobile device 200 displaying an example graphical user interface 302 (or "GUI 302") by way of the touch screen 204. The GUI 302 can be a graphical user interface that facilitates the configuration of one or more aspects of a product information request. For example, the GUI 302 can include content, information, and/or options that can assist a user in selecting a group of co-users to receive the product information request and/or a product or product category associated with the product information request.

In particular, the GUI 302 includes a first portion 304 for selecting one or more co-users and/or groups of co-users, to which the user would like to send the product information request. For instance, the first portion 304 of the GUI 302 can include selectable options that allow the user to identify which co-users the user desires to send the product information request. As described above, the group manager 114 may suggest users and/or groups of users for receiving a product information request. As such, one or more of the users and/or groups of users included in the first portion 304 may be based on suggestions from the group manager 114. For example, the first portion 304 can include one or more relevant Facebook groups (such as social networking groups associated with a particular product or product category), "friends" of the user, "friends of friends," professional reviewers (such as CNET), outside and/or third-party reviewers (such as EBay or Amazon reviews), or other co-users. The user can utilize the first portion 304 to select the users and/or groups of users to target with the product information request. Additionally or alternatively, the first portion 304 can include one or more options (e.g., a fillable field) for manually searching for, adding, and/or removing co-users, for example, using an open graph search, as described above. Accordingly, the user can utilize the first portion to select one or more users and/or groups of users to receive the product information request.

In additional or alternative embodiments, the social networking system 104 may prepopulate the first portion 304 with automatically selected users. For example, the social networking system 104 may prepopulate the selected users based on the user's most recent or most frequently-used selections. Further, the social networking system 104 may prepopulate the selected users based on default selections (e.g., defaults set by the user). In this manner, the social networking system 104 may automatically identify one or more groups of co-users without prompting the user to select users whom to send a product information request.

In some embodiments, as described above, the user can initiate the product information request. For example, the user may select an option on a social networking profile page that asks, "Would you like a product recommendation from friends?" In this instance, the product interest detector 112 and/or group manager 114 may present the user with the user interface that allows a user to both select users to receive a product information request and to select a product or product category, as illustrated in FIG. 3. In particular, the GUI 302 can include a second portion 306 that allows the user to select and/or modify a selection of one or more products and/or product categories associated with the product information request. The second portion 306 may be prepopulated with suggested products/product categories, from which the user can select who will receive the product information request. Additionally, the second portion 306 can include a field for manually searching for, adding, and/or removing products/product categories to the product information request.

In some embodiments, the product interest detector 112 may infer product categories for which the user desires to obtain additional information. For example, if the user requests to send a product information request from a mothers with toddlers walking group, the product interest detector 112 may infer that the user is interested in strollers or some other relevant product/product category. As another example, if the user has recently been shopping for laser printers and car stereos, the product interest detector 112 may suggest (e.g., within the second portion) laser printers and/or car stereos as product category options the user may select. Alternatively, the second portion 306 can permit manual entry of a product or product category, for example, using the open graph search, as described above. Although the illustrated example of the second portion includes various product categories, one will appreciate that the second portion 306 can additionally or alternatively include one or more specific products.

Although not shown, the social networking system 104 (e.g., by way of the mobile device 200) may also provide one or more graphical user interfaces to facilitate the creation of one or more components to include in the product information request. For example, as described in more detail above, the user can utilize the mobile device 200 to select and/or create one or more questions regarding one or more products, one or more requests for ratings of one or more products, one or more requests for regarding one or more products, one or more requests for reviews of one or more products, selectable options (e.g., control elements, graphical buttons, radio buttons) for responding to the product information request, one or more pieces of content (e.g., product images, product descriptions, URLs for product web pages, etc.) to present within the product information request, and/or any other suitable request components to include in the product information request. As an illustrative example, the user may utilize the mobile device to create a question inquiring what color of a particular product each co-user recommends, to create one or more available responses corresponding to the available colors of the product, and/or select an image corresponding to each available response (e.g., an image showing the product in the color of the corresponding response). Accordingly, a co-user receiving the product information request may be presented with the question and each of the available responses, and each response may be accompanied by a corresponding image illustrating the response.

Once the user utilizes the GUI 302 to select users for receiving the product information request and/or to select one or more products and/or product categories related to the product information request, the social networking system (e.g., the product data manager 116) can send the product information request to the selected users.

Referring to FIG. 4, which illustrates a mobile device 200 having a graphical user interface 402 ("GUI 402") showing an example a product information request 408 in accordance with principles disclosed herein. The mobile device 200 illustrated in FIG. 4 may be the mobile device 200 described in connection with FIGS. 2A-2B. For example, the mobile device 200 in FIG. 4 may present the GUI 402 by way of a touchscreen 204 that facilitates interaction between a user and a mobile social networking application, as described in connection with FIG. 2.

As illustrated in FIG. 4, an exemplary co-user of the social networking system 104 can receive the product information request 408 from the social networking system 104 on behalf the sending user (e.g., "Kate Miller"). As shown, the product information request 408 offers a group of selectable options 404 for the co-user to respond to the product information request. In particular, the product information request 408 allows the co-user to select which smartphone they recommend. Further, upon selecting a smartphone, model, options and/or features 410 (e.g., memory size, color, data plan, trim, accessories, complementary products or applications, etc.) may appear allowing the co-user to further provide a more specific smartphone recommendation to the user. The co-user can optionally enter a review or other comments in field 406. Because the co-user is likely familiar with the user (e.g., Kate Miller), the co-user can provide personalized feedback regarding the product based on the co-user's knowledge of the user's habits, preferences, interests, and lifestyle. In this manner, when a number of co-users respond to the product information request 402, the user can receive personalized, relevant, and valuable feedback in regards to a potential product purchase.

FIGS. 5A-5B illustrate the mobile device 200 presenting a graphical user interface 502 for providing a summary of product information (i.e., a product presentation) to a user using the principles described herein. The mobile device 200 illustrated in FIGS. 5A-5B may be the mobile device 200 described in connection with FIGS. 2A-2B. For example, the mobile device 200 in FIGS. 5A-5B may include a touchscreen 204 that facilitates interaction between a user and a mobile social networking application, as described in connection with FIG. 2.

As illustrated in FIG. 5A, the provided product presentation may include a recommendation summary 506 comprising a summary of recommendations received in response to a product information request. Alternatively, the product presentation manager 118 may present the recommendation summary 506 in response to the product interest detector 112 detecting that the user is interested in the product or product category corresponding to the recommendation summary 506, as described above.

As shown in FIG. 5A, the recommendation summary 506 is directed towards smartphones, however, the recommendation summary 506 may be directed to any product or product category of interest to a user or related to a product information request sent by the user. The recommendation summary 506 can include percentages, ranking, ratings, etc. summarizing product information for one or more products or product categories. The recommendation summary 506 may present products in alphabetical order, according to ranking recommendation, or according to another criterion, as described above. To illustrate, the recommendation summary 506 includes a list of recommended smartphones sorted by the percentages of responding co-users that recommended each smartphone.

As described above, the product presentation manager 118 can update the recommendation summary 506 as additional product information is received. For example, when a new co-user submits a response to a product information request, the percentages associated with each smartphone in the recommendation summary 506 may change.

In one or more embodiments, the recommendation summary 506 can also provide links (e.g., link 510) to additional material, such as product ratings and/or reviews. For example, each product name can include a link to a product page associated with the product and that, in some embodiments, is personalized for the user as described in more detail above. For instance, a personalized product page can include comments, ratings, and reviews from co-users as well as product information such as the product name, price, and image. The personalized product page may include an option for the user to save the product for later consideration, or to further research related products.

In addition, the recommendation summary 506 may also provide a link 504 to a product category page (e.g., a profile page that shows additional information regarding the product category). For example, the link 504 may direct the user to a profile page associated with smartphones. In some examples, the product category profile page can be customized for the user, as discussed in more detail above. Alternatively, the link 504 may direct the user to a general (e.g., non-personalized) product category page.

In some example embodiments, the recommendation summary 506 may present recommendations from multiple groups of users, as represented by one or more selectable tabs 514. For example, the user may utilize the tabs 514 to display recommendation results from "friends," friends of friends," or "Everyone." Additionally or alternatively, recommendation information from other groups of co-users may also be accessible by way of the GUI 502. As the user utilizes the tabs 514 to display recommendations from different groups of co-users, the recommendation summary 506 may change to match the selected group of co-users. In this manner, the user can compare whether the recommendations from friends differ from the recommendations of other co-user groups of the social networking system 104.

As shown in FIG. 5B, the product presentation may also include a ratings summary 508. The GUI 502 may present the ratings summary 508 in addition to, or in place of, the recommendation summary 506 shown in FIG. 5A. The ratings summary 508 may provide a summary of product ratings (e.g., smartphone ratings) received from co-users. For example, the ratings summary 508 can include, and be sorted by, average ratings for each of the listed products. Similar to the recommendation summary 506, a user can utilize the tabs 514 to access a ratings summary that is specific to each corresponding group of co-users. The ratings summary 508 may correspond to features, options, and/or overall user preference of a product rather than whether a co-user recommends a particular product for the user. In some instances, the ratings summary 508 may differ from the recommendation summary 506 (e.g., the ratings summary 508 and the recommendation summary 506 may rank the same products in a different order). In additional or alternative embodiments, the product presentation can include additional product information, summarized, and/or customized any other suitable manner, such as disclosed herein.

Figure 6:
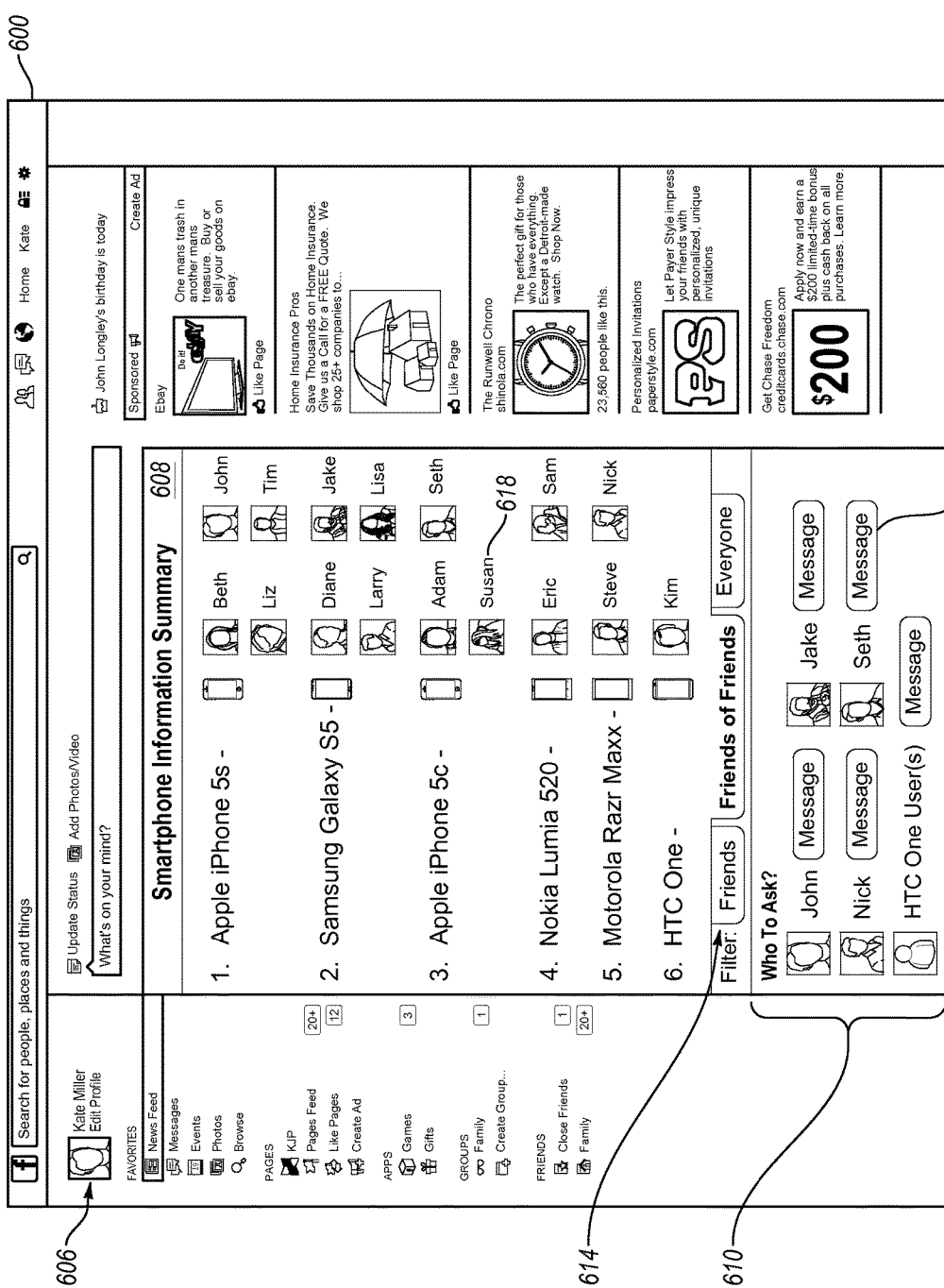
FIG. 6 illustrates a graphical user interface of a social networking application showing a product information summary in accordance with one or more embodiments.

FIG. 6 illustrates a graphical user interface 600 ("GUI 600") of a social networking application showing another example of a product presentation. The GUI 600 may be displayed on a client device, such as the client device 102a described in connection with FIG. 1. For example, a user 606 may use the GUI 600 to interact with the social networking system 104 via a web-based social networking application. Further, one will appreciate that the social networking application illustrated in FIG. 6 may be executed on various types of computing devices, as described below in connection with FIG. 12.

As illustrated in FIG. 6, the product presentation can include a product information summary 608 for a number of products. For example, the product information summary 608 includes a summary of information for a plurality of smartphones.

In some embodiments, the product information summary 608 may rank products within a product category according to popularity, recommendations, reviews, and/or ratings, as described above. Also, the product information summary 608 may filter product results according to groups of co-users 614. For example, the product information summary 608 may provide recommendations and/or product information from multiple co-user groups 614, as described above. For example, the user 606 may select to display recommendations from "friends," "friends of friends," or "Everyone." As the user 606 selects to display recommendations and/or information from different groups of co-users 614, the product information summary 608 may update to match the appropriate co-user group.

In some example embodiments, each product in the product information summary 608 may be associated with one or more co-users. For example, as shown in FIG. 6, the Samsung Galaxy S5 is associated with the co-users Diane, Jake, Larry, and Lisa. The co-users shown in connection with a product may indicate co-users that own and/or use the product. Alternately, co-users shown in connection with a product may recommend that the user (e.g., Kate Miller) purchase the corresponding product (e.g., the co-users vote that the user buy the particular product). For example, Beth may have responded to Kate Miller's product information request indicating that Kate should get an iPhone 5s. As such, a name and/or image of Beth may appear next to the iPhone 5s in the product information summary 608.

The product presentation manager 118 can present the product information summary 608 to a user 606 in response to a product information request initiated by the user 606. For example, the product presentation manager 118 may present the product information summary 608 after receiving the results of a product information request. Alternatively, the product presentation manager 118 may present the product information summary 608 in response to detecting the user's 606 interest in a product or product category, as describe above.

In further embodiments, the product information summary 608 can include a listing of one or more co-users 610 (i.e., suggested co-users) that the user can contact for additional product information. As described above, the suggested co-users 610 may have an apparent experience with or expertise related to one or more products or the product category related to the product information summary 608. As shown, the listing can include, for each suggested co-user 610, an option (e.g., option 616) for initiating a communication with the suggested co-user 610. In some examples, the option 616 may be dynamically updated to use a communication medium through which the corresponding suggested co-user 610 is currently available.

In one or more example embodiments, each suggested co-user 610 may be associated with a particular product. For example, John may have experience with the iPhone 5s, while Nick has experience with the Razr Maxx. While not illustrated, each suggested co-user 610 associated with a particular device may have an icon of the corresponding device next to their name and/or picture, or be otherwise associated with the corresponding device.

Further, in some example embodiments, the suggested co-user 610 may be generically associated with a particular product. For example, one of the suggested co-users 610 may be identified as an "HTC One User(s)." The user 606 may select to message the HTC One User when the user wants to obtain device-specific information for the HTC One from a co-user who has experience with the HTC One, even though the HTC One User may not be connected to the user 606, and/or may be a third-party. Alternately, rather than messaging a generic product user (or known product co-users), the social networking system 104 may provide a link to a group, forum, discussion board, etc., that includes users associated with a particular product. For example, the option 616 for the HTC One User may instead be a link to a forum of HTC One users where the user 606 can obtain additional information about the HTC One.

In some example embodiments, the user 606 may desire to access product information associated with a particular co-user. In some embodiments, each co-user included in the product information summary 608 may be selectable to access product information specific to the co-user. For example, in response to a selection of the co-user Susan 618 associated with the iPhone 5c, the user 606 can be directed to a summary of product information that is specific to the co-user Susan 618, an example of which is shown in FIG. 7.

Figure 7:
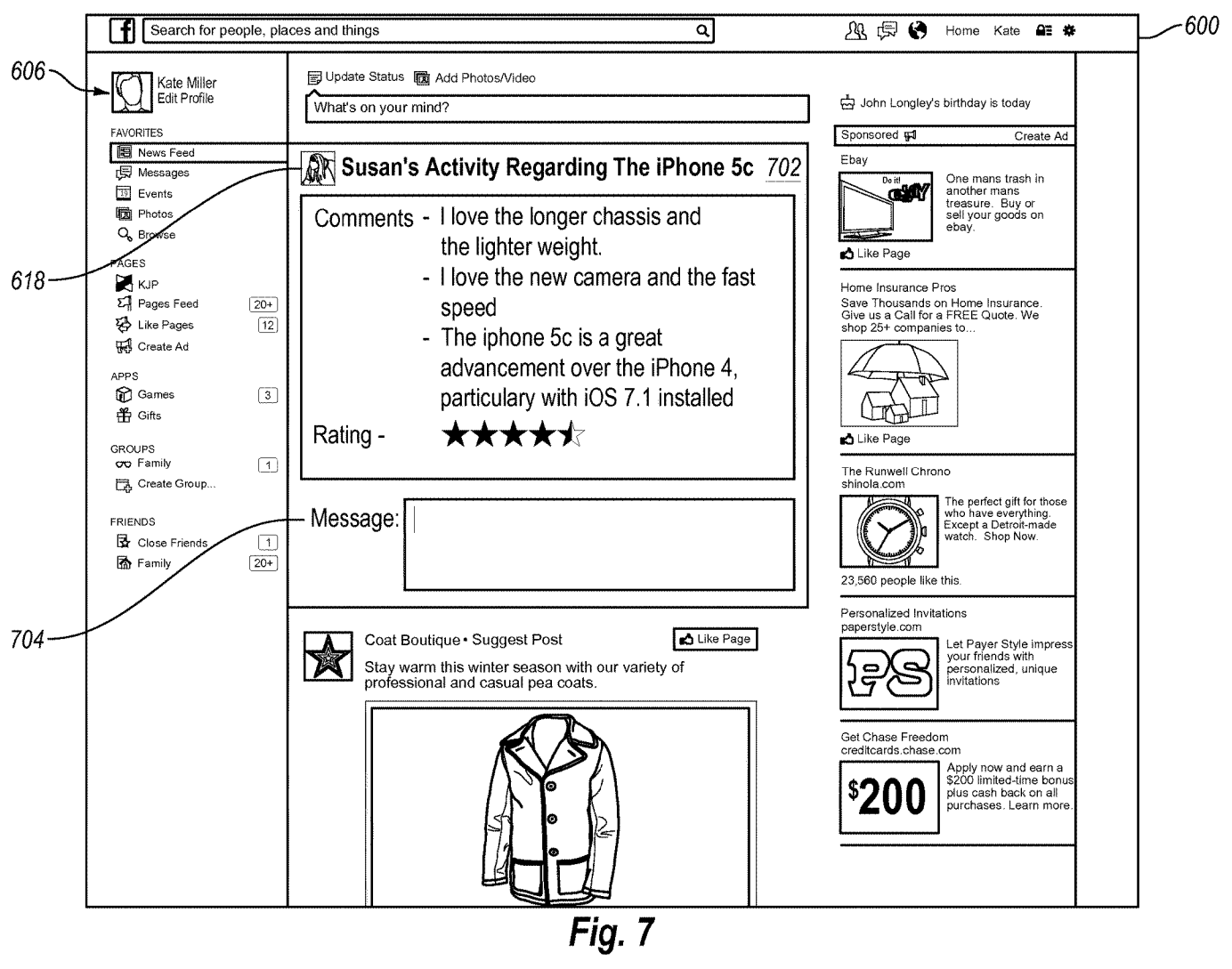

In particular, FIG. 7 illustrates an updated version of the GUI 600 in response to a selection of Susan 618 (e.g., in response to a selection of Susan's picture or name from the product information summary 608). As shown, the GUI 600 now includes a user-specific product information summary 702 labeled "Susan's Activity Regarding The iPhone 5c." Within the user-specific product information summary 702, the user 606 can review product information that is specific to Susan 618. In particular, the user-specific product information summary can include ratings, reviews, comments, and recommendations for Susan 618 regarding the corresponding product and/or other related products. Further, the GUI 600 includes a field 704 that the user can utilize to send a message to Susan 618 (e.g., to ask Susan 618 one or more additional questions regarding a product or product category).

FIGS. 1-7, the corresponding text, and the examples, provide a number of different systems, devices, and graphical user interfaces for acquiring and/or providing product information to a user. In addition to the foregoing, embodiments disclosed herein also can be described in terms of flowcharts comprising acts and steps in a method for accomplishing a particular result. For example, FIGS. 8-11 illustrate flowcharts of exemplary methods in accordance with one or more embodiments disclosed herein. The methods described in relation to FIGS. 8-11 can be performed with less or more steps/acts or the steps/acts can be performed in differing orders. Additionally, the steps/acts described herein can be repeated or performed in parallel with one another or in parallel with different instances of the same or similar steps/acts.

Figure 8:
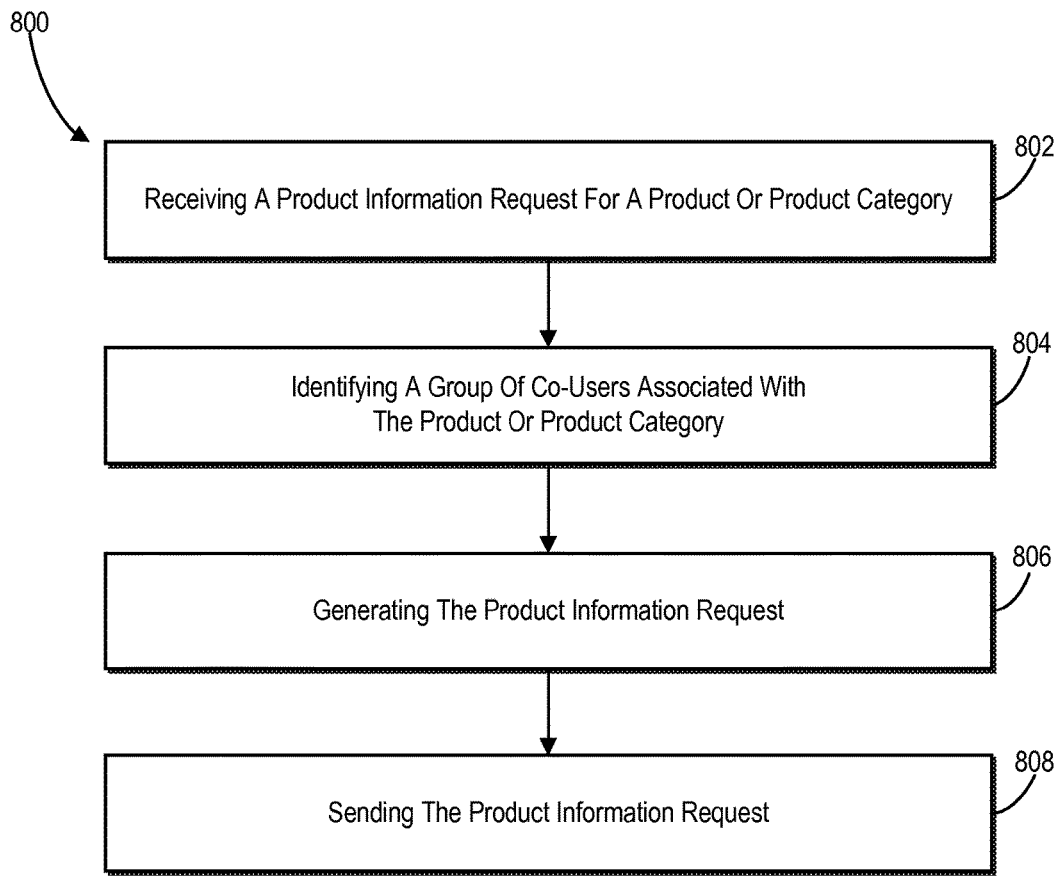
FIG. 8 illustrates a flowchart of an exemplary method for requesting product information request in accordance with one or more embodiments.

FIG. 8 illustrates a flowchart of an example method 800 for requesting a product information request. Method 800 can be implemented by system 100 and/or executed by social networking system 104 and/or client devices 102. The method 800 includes an act 802 of receiving a product information request for a product or product category. In particular, the act 802 may include receiving, from a user of a social networking system, user input corresponding to a product information request for a particular product or product category. For example, the act 802 may include the product interest detector 112 of the social networking system 104 detecting user interest in a product or product category, prompting the user to send a product information request, and receiving user input in response to the request, in any suitable manner, as disclosed herein.

In addition, the method 800 further includes an act 804 of identifying a group of co-users associated with the product or product category. In particular, the act 804 may include identifying, based on the product information request for the particular product or product category, a group of co-users to send the product request. For example, the act 804 may include a group manager 114 of the social networking system 104 identifying co-users of the social networking system 104 associated with the product or product category.

Further, the method 800 includes an act 806 of generating the product information request. In particular, the act 806 may include generating, by the social networking system, the product information request for the particular product or product category based on the received user input. For example, the act 806 may include a product data manager 116 of the social networking system 104 generating a product information request based on user selections, in any suitable manner disclosed herein.

The method 800 also includes an act 808 of sending the product information request. In particular, the act 808 may include sending the generated product information request to the identified group of co-users. For example, the act 808 may include the product data manager 116 sending the generated product information request to one or more groups of co-users, in any suitable manner described herein.

Figure 9:
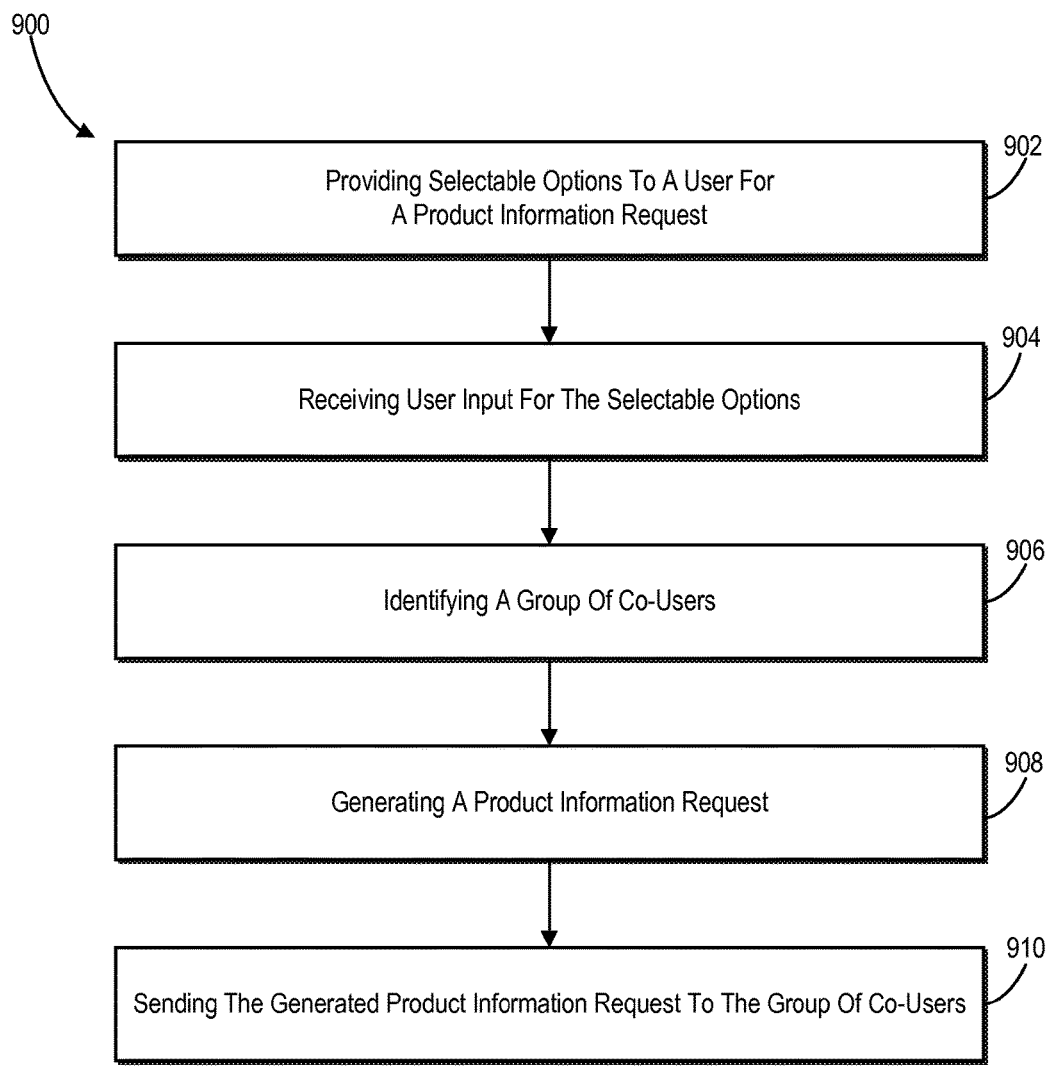
FIG. 9 illustrates a flowchart of another exemplary method for requesting product information request in accordance with one or more embodiments.

FIG. 9 illustrates a flowchart of another example method 900 for requesting a product information request. Method 900 can be implemented by system 100 and/or social networking system 104. The method 900 includes an act 902 of providing selectable options to a user for a product information request. In particular, the act 902 may include providing, to a user of a social networking system 104, a plurality of selectable options for configuring a product information request associated with a particular product or product category. For example, the act 902 may include the product data manager 116 of the social networking system 104 providing one or more selectable options to a user to include in a product information request, in any suitable manner, as disclosed herein.

Further, the method 900 includes an act 904 of receiving user input for the selectable options. In particular, the act 904 may include receiving, from the user, user input by way of the plurality of selectable options for configuring the product information request. For example, the act 904 may include the product data manager 116 of the social networking system 104 receiving user input by way of the selectable options, as described herein.

Additionally, the method 900 includes an act 906 of identifying a group of co-users. In particular, the act 906 may include identifying, by the social networking system 104 and based at least in part on the received user input, a group of co-users of the social networking system. For example, the act 906 may include a group manager 114 of the social networking system 104 identifying one or more groups of co-users, in any suitable manner disclosed herein.

The method 900 also includes an act 908 of generating a product information request. In particular, the act 908 may include generating, by the social networking system 104, the product information request for the particular product or product category based on the received user input. For example, the act 908 may include the product data manager 116 of the social networking system 104 generating a product information request for a product or product category, in part, based on the user input, as described herein.

In addition, the method 900 includes an act 910 of sending the product information request to the group of co-users. In particular, the act 910 may include sending the generated product information request to the identified group of co-users. For example, the act 910 can include a product data manager 116 of the social networking system 104 sending the generated product information request to one or more groups of co-users, in any suitable manner described herein.

Figure 10:
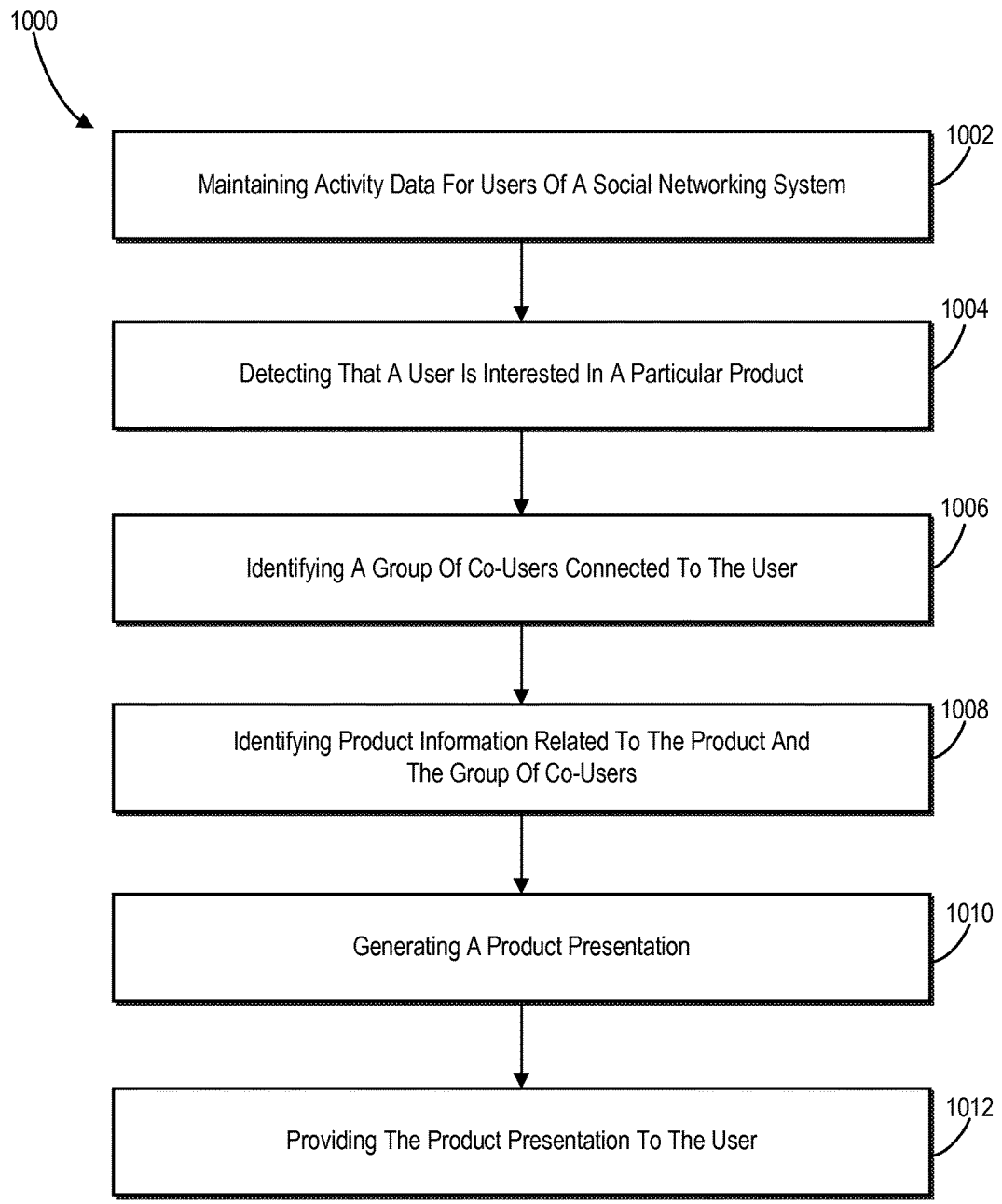
FIG. 10 illustrates a flowchart of an exemplary method for presenting a product information presentation to a user in accordance with one or more embodiments.

Referring now to FIG. 10, which illustrates a flowchart of an example method 1000 for presenting a product presentation to a user. Method 1000 can be implemented by system 100 and/or social networking system 104. As shown, the method 1000 includes an act 1002 of maintaining activity data for users (e.g., the user and co-users) of the social networking system 104. In particular, the act 1002 may include maintaining, by the social networking system 104, activity data for a plurality of users of the social networking system 104. For example, the act 1002 can include the activity data manager 110 tracking, monitoring, organizing, and recording activity data for users of the social networking system 104, in any suitable manner disclosed herein.

In addition, the method 1000 includes an act 1004 of detecting that a user is interested in a particular product. In particular, the act 1008 may include detecting that a user of a social networking system 104 is interested in a particular product or product category. For example, the act 1008 may include a product interest detector 112 of the social networking system 104 detecting that a user is interested in a particular product or product category, in any suitable manner as disclosed herein.

The method 1000 also includes act 1006 of identifying a group of co-users connected to the user. In particular, the act 1006 may include identifying a group of co-users connected to the user by way of the social networking system 104. For example, the act 1006 may include a group manager 114 of the social networking system 104 identifying one or more groups of co-users that are associated with the user, as described herein.

In addition, the method 1000 includes an act 1008 of identifying product information related to the product and the group of co-users. In particular, the act 1008 may include identifying product information related to the particular product or product category and related to the identified group of co-users. For example, the act 1008 may include a product data manager 116 of the social networking system 104 identifying co-users in the groups of co-users that are related to the particular product or product category, in any suitable manner as disclosed herein.

Further, the method 1000 includes an act 1010 of generating a product presentation. In particular, the act 1010 may include generating a product presentation comprising a summary of the identified product information. For example, the act 1010 may include a product presentation manager 118 of the social networking system 104 compiling, organizing, and summarizing activity data and product information corresponding to the particular product or product category based on co-users in the groups of co-users that relate the particular product or product category, as described herein.

Additionally, the method 1000 includes an act 1012 of providing the product presentation to the user. In particular, the act 1012 may include providing the product presentation to the user. For example, the act 1012 may include the product presentation manager 118 presenting a product presentation that includes a summary of product information to the user, in any suitable manner as disclosed herein.

Figure 11:
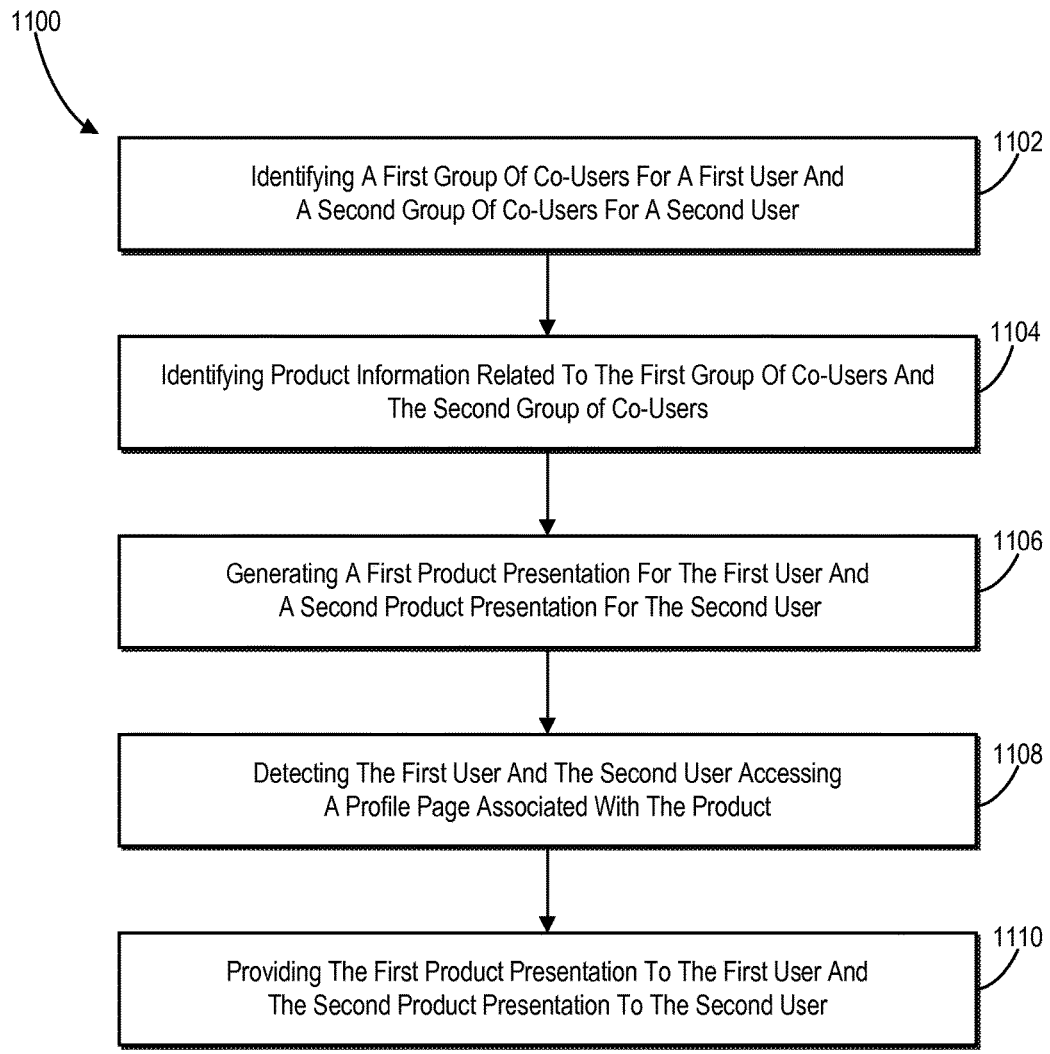
FIG. 11 illustrates another flowchart of an exemplary method for presenting product information presentations to multiple users in accordance with one or more embodiments.

Referring now to FIG. 11, FIG. 11 illustrates a flowchart of an example method 1100 for presenting product information presentations to multiple users. Method 1100 can be implemented by system 100 and/or social networking system 104. As shown, method 1100 includes an act 1102 of identifying a first group of co-users for a first user and a second group of co-users for a second user. In particular, act 1102 may include identifying, for a first user of a social networking system 104, a first group of co-users connected to the first user by way of the social networking system 104 and identifying, for a second user of the social networking system 104, a second group of co-users connected to the second user by way of the social networking system 104. For example, act 1102 can include a group manager 114 of the social networking system 104 identifying one or more groups of users for each user that are associated with each user, as described herein.

Further, the method 1100 includes an act 1104 of identifying product information from the first group of co-users and the second group of co-users. In particular, the act 1104 may include identifying a first set of product information related to co-users in the first group of co-users and related to a particular product or product category, and identifying a second set of product information related to co-users in the second group of co-users and related to the particular product or product category. For example, the act 1104 may include a product data manager 116 of the social networking system 104 identifying users in each of the groups of users that are related to the particular product, in any suitable manner as disclosed herein.

Further, the method 1100 includes an act 1106 of generating a first product presentation for the first user and a second product presentation for the second user. In particular, the act 1106 may include generating, for the first user, a first product presentation comprising a summary of the first set of product information and generating, for the second user, a second product presentation comprising a summary of the second set of product information. For example, for both the first user and the second user, the act 1106 may include a product presentation manager 118 of the social networking system 104 that generates a summary of product information for the product based on co-users in the respective groups of co-users, as described herein.

In addition, the method 1100 includes an act 1108 of detecting the first user and the second user accessing a profile page associated with the product. In particular, the act 1108 may include detecting access by the first user to a profile page associated with the particular product or product category and detecting access by the second user to the profile page associated with the particular product or product category. For example, the act 1108 may include a product interest detector 112 of the social networking system 104 identifying that the first user has accessed a profile page for the product or product category, in any suitable manner as disclosed herein. The product interest detector 112 can also identify that the second user has accessed the same profile page for the product or product category.

Additionally, the method 1100 includes an act 1110 of providing the first product presentation to the first user and the second product presentation to the second user. In particular, the act 1110 may include providing the first product presentation to the first user within the profile page associated with the particular product or product category and providing the second product presentation to the second user within the profile page associated with the particular product or product category. For example, the act 1110 may include the product presentation manager 118 presenting, to the first user, a summary of product information for the product that is customized to the first user, in any suitable manner as disclosed herein. In addition, the product presentation manager 118 may present, to the second user, a summary of product information for the product that is customized to the second user.

Figure 12:
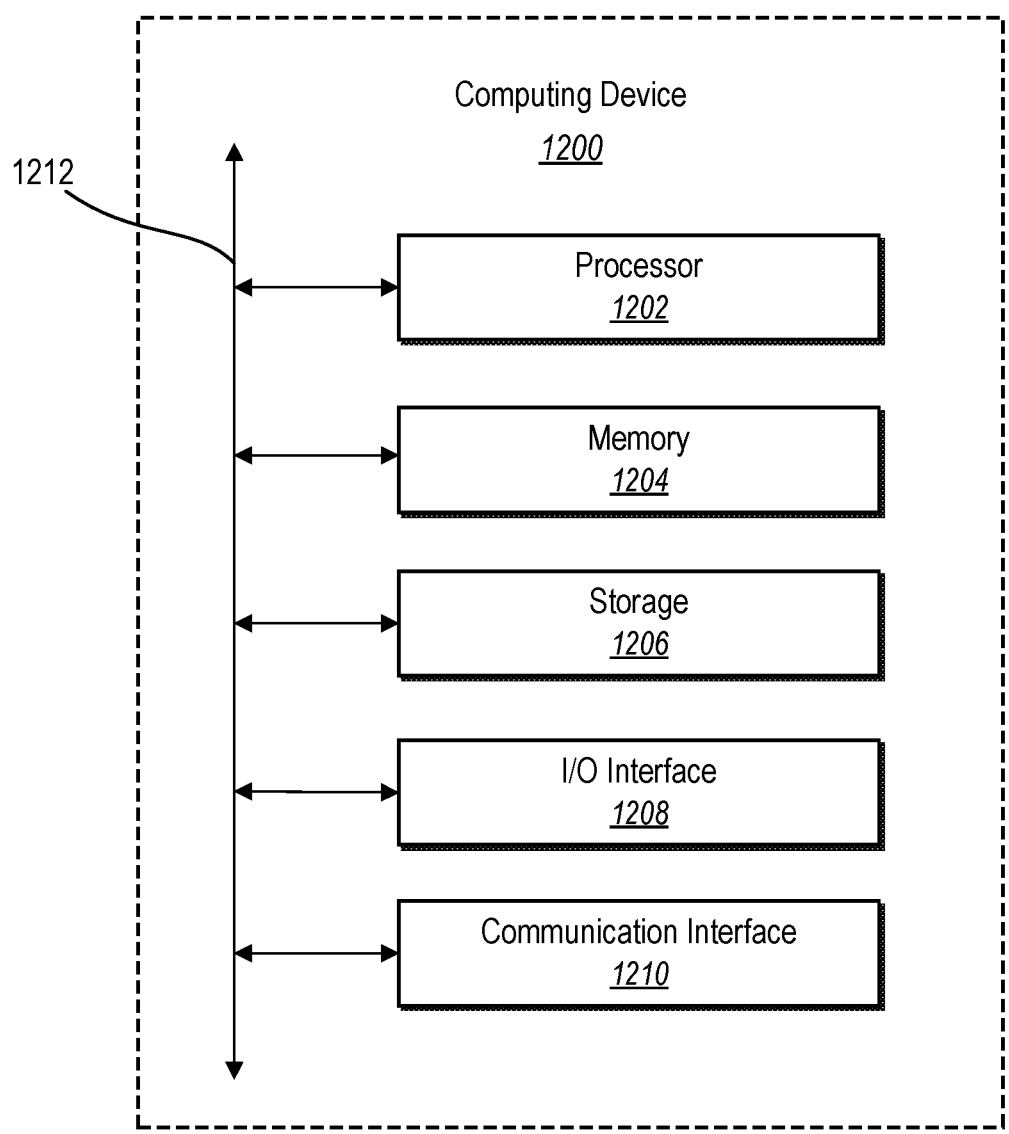
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that social networking system 104, client devices 106, each may comprise one or more computing devices in accordance with the example computing device 1200 shown in FIG. 12. The computing device 1200 can comprise a processor 1202, a memory 1204, a storage device 1206, an I/O interface 1208, and a communication interface 1210, which can be communicatively coupled by way of communication infrastructure 1212. While an exemplary computing device 1200 is shown in FIG. 12, the components illustrated in FIG. 12 are not intended to be limiting. Additional or alternative components can be used in other embodiments. Furthermore, in certain embodiments, a computing device 1200 can include fewer components than those shown in FIG. 12. Components of computing device 1200 shown in FIG. 12 will now be described in additional detail.

In particular embodiments, processor 1202 includes hardware for executing instructions, such as those making up a computer program. As an example and not by way of limitation, to execute instructions, processor 1202 can retrieve (or fetch) the instructions from an internal register, an internal cache, memory 1204, or storage device 1206 and decode and execute them. In particular embodiments, processor 1202 can include one or more internal caches for data, instructions, or addresses. As an example and not by way of limitation, processor 1202 can include one or more instruction caches, one or more data caches, and one or more translation lookaside buffers (TLBs). Instructions in the instruction caches can be copies of instructions in memory 1204 or storage 1206.

Memory 1204 can be used for storing data, metadata, and programs for execution by the processor(s). Memory 1204 can include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1204 can be internal or distributed memory.

Storage device 1206 includes storage for storing data or instructions. As an example and not by way of limitation, storage device 1206 can comprise a non-transitory storage medium described above. Storage device 1206 can include a hard disk drive (HDD), a floppy disk drive, flash memory, an optical disc, a magneto-optical disc, magnetic tape, or a Universal Serial Bus (USB) drive or a combination of two or more of these. Storage device 1206 can include removable or non-removable (or fixed) media, where appropriate. Storage device 1206 can be internal or external to the computing device 1200. In particular embodiments, storage device 1206 is non-volatile, solid-state memory. In other embodiments, Storage device 1206 includes read-only memory (ROM). Where appropriate, this ROM can be mask programmed ROM, programmable ROM (PROM), erasable PROM (EPROM), electrically erasable PROM (EEPROM), electrically alterable ROM (EAROM), or flash memory or a combination of two or more of these.

I/O interface 1208 allows a user to provide input to, receive output from, and otherwise transfer data to and receive data from computing device 1200. I/O interface 1208 can include a mouse, a keypad or a keyboard, a touch screen, a camera, an optical scanner, network interface, modem, other known I/O devices or a combination of such I/O interfaces. I/O interface 1208 can include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1208 is configured to provide graphical data to a display for presentation to a user. The graphical data can be representative of one or more graphical user interfaces and/or any other graphical content as can serve a particular implementation.

Communication interface 1210 can include hardware, software, or both. In any event, communication interface 1210 can provide one or more interfaces for communication (such as, for example, packet-based communication) between computing device 1200 and one or more other computing devices or networks. As an example and not by way of limitation, communication interface 1210 can include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1210 can facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, communication interface 1210 can facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 1212 can include hardware, software, or both that couples components of computing device 1200 to each other. As an example and not by way of limitation, communication infrastructure 1212 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, one or more features disclosed herein may be implemented within a social networking system. A social networking system can enable its users (such as persons or organizations) to interact with the system and with each other. The social networking system can, with input from a user, create and store in the social networking system a user profile associated with the user. The user profile can include demographic information, communication-channel information, and information on personal interests of the user. The social networking system can also, with input from a user, create and store a record of relationships of the user with co-users of the social networking system, as well as provide services (e.g. wall posts, photo-sharing, event organization, messaging, games, or advertisements) to facilitate social interaction between or among users.

The social networking system can store records of users and relationships between users in a social graph comprising a plurality of nodes and a plurality of edges connecting the nodes. The nodes can comprise a plurality of user nodes and a plurality of concept nodes. A user node of the social graph can correspond to a user of the social networking system. A user can be an individual (human user), an entity (e.g., an enterprise, business, or third party application), or a group (e.g., of individuals or entities). A user node corresponding to a user can comprise information provided by the user and information gathered by various systems, including the social networking system.

For example, the user can provide his or her name, profile picture, city of residence, contact information, birth date, gender, marital status, family status, employment, educational background, preferences, interests, and other demographic information to be included in the user node. Each user node of the social graph can have a corresponding web page (typically known as a profile page). In response to a request including a user name, the social networking system can access a user node corresponding to the user name, and construct a profile page including the name, a profile picture, and other information associated with the user. A profile page of a first user can display to a second user all or a portion of the first user's information based on one or more privacy settings by the first user and the relationship between the first user and the second user.

As mentioned above, one or more features disclosed herein may be implemented within a social networking system. A social networking system can enable its users (such as persons or organizations) to interact with the system and with each other. The social networking system can, with input from a user, create and store in the social networking system a user profile associated with the user. The user profile can include demographic information, communication-channel information, and information on personal interests of the user. The social networking system can also, with input from a user, create and store a record of relationships of the user with co-users of the social networking system, as well as provide services (e.g. wall posts, photo-sharing, event organization, messaging, games, or advertisements) to facilitate social interaction between or among users.

The social networking system can store records of users and relationships between users in a social graph comprising a plurality of nodes and a plurality of edges connecting the nodes. The nodes can comprise a plurality of user nodes and a plurality of concept nodes. A user node of the social graph can correspond to a user of the social networking system. A user can be an individual (human user), an entity (e.g., an enterprise, business, or third party application), or a group (e.g., of individuals or entities). A user node corresponding to a user can comprise information provided by the user and information gathered by various systems, including the social networking system.

For example, the user can provide his or her name, profile picture, city of residence, contact information, birth date, gender, marital status, family status, employment, educational background, preferences, interests, and other demographic information to be included in the user node. Each user node of the social graph can have a corresponding web page (typically known as a profile page). In response to a request including a user name, the social networking system can access a user node corresponding to the user name, and construct a profile page including the name, a profile picture, and other information associated with the user. A profile page of a first user can display to a second user all or a portion of the first user's information based on one or more privacy settings by the first user and the relationship between the first user and the second user.

A concept node can correspond to a concept of the social networking system. For example, a concept can represent a real-world entity, such as a movie, a song, a sports team, a celebrity, a group, a restaurant, or a place or a location. An administrative user of a concept node corresponding to a concept can create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address), or contact information (e.g., a phone number, an email address). Each concept node of the social graph can correspond to a web page. For example, in response to a request including a name, the social networking system can access a concept node corresponding to the name, and construct a web page including the name and other information associated with the concept.

An edge between a pair of nodes can represent a relationship between the pair of nodes. For example, an edge between two user nodes can represent a friendship between two users. For another example, the social networking system can construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social networking system a request to create an edge between a user node of the user and a concept node of the concept, indicating a relationship between the user and the concept (e.g., the user checks in to a restaurant, or the user "likes" a celebrity).

As an example, a user can provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) can be described as "connected users" or "friends." Similarly, two users having user nodes that are connected only through another user node (i.e., are second-degree nodes) can be described as "friends of friends."

A social networking system can support a variety of applications, such as photo sharing, on-line calendars, and events, gaming, instant messaging, and advertising. For example, the social networking system can also include media sharing capabilities. Also, the social networking system can allow users to post photographs and other multimedia files to a user's profile page (typically known as "wall posts" or "timeline posts") or in a photo album, both of which can be accessible to other users (e.g., co-users) of the social networking system depending upon the user's configured privacy settings. The social networking system can also allow users to configure events. For example, a first user can configure an event with attributes including time and date of the event, location of the event and other users invited to the event. The invited users can receive invitations to the event and respond (such as by accepting the invitation or declining it). Furthermore, the social networking system can allow users to maintain a personal calendar. Similarly to events, the calendar entries can include times, dates, locations, and identities of other users.

Figure 13:
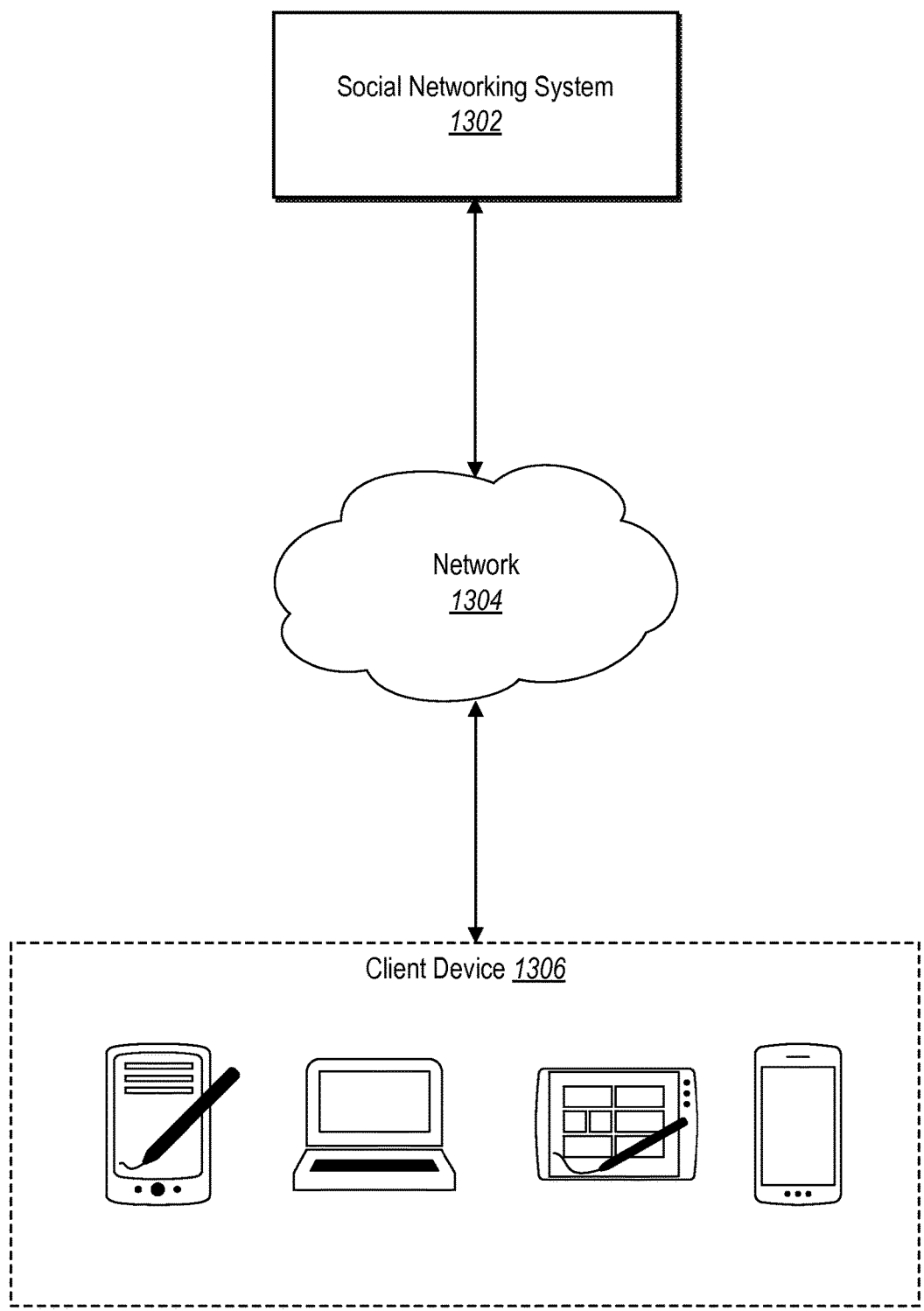
FIG. 13 is an example network environment of a social networking system in accordance with one or more embodiments.

FIG. 13 illustrates an example network environment of a social networking system. In particular embodiments, a social networking system 1302 can comprise one or more data stores. In particular embodiments, the social networking system 1302 can store a social graph comprising user nodes, concept nodes, and edges between nodes as described earlier. Each user node can comprise one or more data objects corresponding to information associated with or describing a user. Each concept node can comprise one or more data objects corresponding to information associated with a concept. Each edge between a pair of nodes can comprise one or more data objects corresponding to information associated with a relationship between users (or between a user and a concept, or between concepts) corresponding to the pair of nodes.

In particular embodiments, the social networking system 1302 can comprise one or more computing devices (e.g., servers) hosting functionality directed to operation of the social networking system 1302. A user of the social networking system 1302 can access the social networking system 1302 using a client device such as client device 1306. In particular embodiments, the client device 1306 can interact with the social networking system 1302 through a network 1304.

The client device 1306 can be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 1306 can execute one or more client applications, such as a web browser (e.g., MICROSOFT WINDOWS INTERNET EXPLORER, MOZILLA FIREFOX, APPLE SAFARI, GOOGLE CHROME, OPERA, etc.) or a native or special-purpose client application (e.g., FACEBOOK for IPHONE or IPAD, FACEBOOK for ANDROID, etc.), to access and view content over network 1304.

Network 1304 can represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1306 can access the social networking system 1302.

While these methods, systems, and user interfaces utilize both publicly available information as well as information provided by users of the social networking system, all use of such information is to be explicitly subject to all privacy settings of the involved users and the privacy policy of the social networking system as a whole.

In the foregoing specification, one or more embodiments have been described with reference to specific exemplary embodiments thereof. Various embodiments and aspects thereof are described with reference to details discussed herein, and the accompanying drawings illustrate the various embodiments. The description above and drawings are for illustrative purposes and are not to be construed as limiting. Numerous specific details are described to provide a thorough understanding of various embodiments disclosed herein.

The methods and systems described herein can be embodied in other specific forms without departing from their spirit or essential characteristics. The described embodiments are to be considered in all respects only as illustrative and not restrictive. For example, the methods described herein can be performed with less or more steps/acts or the steps/acts can be performed in differing orders. Additionally, the steps/acts described herein can be repeated or performed in parallel with one another or in parallel with different instances of the same or similar steps/acts. The scope of the embodiments disclosed herein is, therefore, indicated by the appended claims rather than by the foregoing description. All changes that come within the meaning and range of equivalency of the claims are to be embraced within their scope.

I claim:

1. A method comprising:
   maintaining, by a social networking system, activity data for a plurality of users of the social networking system;
   detecting that a user of the social networking system is interested in a particular product or product category based on detecting a user interaction by the user with the particular product or product category;
   identifying, from the plurality of users of the social networking system and based on detecting that the user is interested in the particular product or product category, a group of co-users within a threshold degree-of-separation with the user by way of the social networking system and that have used the particular product or have used a product within the product category, wherein the threshold degree-of-separation is between one degree of separation and three degrees of separation;
   detecting an interaction between a co-user in the identified group of co-users and the social networking system using the particular product or the product within the product category to access the social networking system;
   identifying, from the identified group of co-users, product information related to the particular product or product category that corresponds to the identified group of co-users;
   generating, using at least one processor, a product presentation comprising a summary of the identified product information from the identified group of co-users; and
   providing the product presentation, comprising the summary of the identified product information from the identified group of co-users, to the user.

2. The method of claim 1, wherein identifying the product information comprises identifying product information for multiple products, and wherein the summary of the identified product information comprises a summary of product information for each of the multiple products.

3. The method of claim 1, further comprising:
   identifying a second group of co-users that have used the particular product or have used a product within the product category, wherein the second group of co-users have a different threshold degree-of-separation with the user;
   identifying, from the second identified group of co-users, additional product information related to the particular product or product category that corresponds to the second identified group of co-users; and
   including a summary of the additional product information in the product presentation for the second identified group of co-users.

4. The method of claim 1, wherein the identified group of co-users comprises co-users having one degree of separation with the user by way of the social networking system, co-users having two degrees of separation with the user by way of the social networking system, or co-users in a social networking group within the social networking system to which the user belongs.

5. The method of claim 1, wherein the product information comprises recommendations, ratings, and reviews of the particular product or product category by the group of co-users.

6. The method of claim 1, further comprising ranking, within the product presentation, multiple products associated with the particular product or product category.

7. The method of claim 1, further comprising determining that a co-user in the identified group of co-users has used a product within the product category based on the co-user previously purchasing a product within the product category.

8. The method of claim 7, wherein detecting the interaction between the co-user in the identified group of co-users and the social networking system comprises detecting the interaction by detecting a download of a mobile social networking application, detecting a login to the social networking system, or an upload of content to the social networking system.

9. The method of claim 1, wherein the identified group of co-users comprise co-users that have purchased the particular product.

10. The method of claim 1, wherein the product presentation further comprises a list of the co-users from the group of co-users.

11. The method of claim 10, further comprising providing a selectable option within the product presentation to request additional product information from a co-user from the list of the co-users.

12. The method of claim 1, wherein the product presentation further comprises a list of third-party experts associated with the particular product or product category.

13. The method of claim 1, further comprising:
identifying a social networking group related to the particular product or product category;
identifying additional product information related to the particular product or product category and related to the social networking group; and
including a summary of the additional product information in the product presentation.

14. The method of claim 1, wherein detecting that the user of the social networking system is interested in the particular product or product category comprises determining that an interest of the user in the particular product or product category satisfies a threshold interest level.

15. The method of claim 1, further comprising:
identifying product information from third parties outside of the social networking system related to the particular product or product category; and
providing, in the product presentation, access to the identified product information from the third parties outside of the social networking system.

16. The method of claim 1, further comprising customizing a profile page associated with the particular product or product category to include the product presentation, wherein providing the product presentation to the user comprises providing the customized profile page.

17. The method of claim 1, further comprising:
identifying additional product information related to the particular product or product category and related to the identified group of co-users; and
updating the product presentation to include the identified additional product information.

18. A method comprising:
identifying, for a first user of a social networking system, a first group of co-users connected to the first user by way of the social networking system;
identifying, for a second user of the social networking system, a second group of co-users connected to the second user by way of the social networking system;
identifying a first set of product information from co-users in the first group of co-users and related to a particular product or product category, wherein a first co-user in the first group of co-users has accessed the social networking system using the particular product or a product within the product category;
identifying a second set of product information from co-users in the second group of co-users and related to the particular product or product category, wherein a second co-user in the second group of co-users has accessed the social networking system using the particular product or a product within the product category;
generating, for the first user, a first product presentation comprising a summary of the first set of product information from the co-users in the first group of co-users;
generating, for the second user, a second product presentation comprising a summary of the second set of product information from the co-users in the second group of co-users, wherein the first product presentation is distinct from the second product presentation;
detecting, using at least one processor, access by the first user to a profile page associated with the particular product or product category, wherein the profile page comprises a first portion and a second portion;
in response to detecting access by the first user to the profile page associated with the particular product or product category, customizing the first portion of the profile page for the first user to include the first product presentation comprising the summary of the first set of product information while maintaining the second portion;
detecting, using the at least one processor, access by the second user to the profile page associated with the particular product or product category; and
in response to detecting access by the second user to the profile page associated with the particular product or product category, customizing the first portion of the profile page for the second user to include the second product presentation comprising the summary of the second set of product information while maintaining the second portion, wherein the first portion of the profile page is customized differently for the first user and the second user based on the first product presentation being distinct from the second product presentation.

19. A system comprising one or more server devices storing instructions thereon that, when executed by at least one processor, cause the system to:
maintain, by a social networking system, activity data for a plurality of users of the social networking system;
detect that a user of the social networking system is interested in a particular product or product category based on detecting a user interaction by the user with the particular product or product category;
identify, from the plurality of users of the social networking system and based on detecting that the user is interested in the particular product or product category, a group of co-users within a threshold degree-of-separation with the user by way of the social networking system and that have used the particular product or have used a product within the product category, wherein the threshold degree-of-separation is between one degree of separation and three degrees of separation;
detect an interaction between a co-user in the identified group of co-users and the social networking system using the particular product or the product within the product category to access the social networking system;
identify, from the identified group of co-users, product information related to the particular product or product category that corresponds to the identified group of co-users;
generate a product presentation comprising a summary of the identified product information from the identified group of co-users; and
provide the product presentation, comprising the summary of the identified product information from the identified group of co-users, to the user.

20. The system of claim 19, further comprising instructions that, when executed by the at least one processor, cause the system to:
customize a profile page associated with the particular product or product category to include the product presentation comprising the summary of the identified product information from the identified group of co-users; and provide the product presentation to the user within the customized profile page to the user.

* * * * *